(12) United States Patent
Takahashi et al.

(10) Patent No.: US 9,170,424 B2
(45) Date of Patent: Oct. 27, 2015

(54) ILLUMINATION UNIT AND DISPLAY

(75) Inventors: Kazuyuki Takahashi, Kanagawa (JP); Koji Miura, Tokyo (JP); Tatsuya Oiwa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 391 days.

(21) Appl. No.: 13/511,701

(22) PCT Filed: Jul. 22, 2011

(86) PCT No.: PCT/JP2011/066676
§ 371 (c)(1),
(2), (4) Date: Sep. 28, 2012

(87) PCT Pub. No.: WO2012/014797
PCT Pub. Date: Feb. 2, 2012

(65) Prior Publication Data
US 2013/0010002 A1 Jan. 10, 2013

(30) Foreign Application Priority Data
Jul. 30, 2010 (JP) ................... 2010-172840

(51) Int. Cl.
*G02B 27/18* (2006.01)
*G02B 27/42* (2006.01)
(Continued)

(52) U.S. Cl.
CPC .......... *G02B 27/1033* (2013.01); *G02B 5/1842* (2013.01); *G02B 6/0068* (2013.01); *G02B 27/0037* (2013.01); *G02B 27/102* (2013.01); *G02B 27/1046* (2013.01);
(Continued)

(58) Field of Classification Search
CPC .. G02B 6/0068; G02B 27/102; G02B 5/1842; G03B 21/2033; G03B 21/006; G03B 21/2013
USPC ................... 345/633; 359/571; 353/8, 39, 102
See application file for complete search history.

(56) References Cited

U.S. PATENT DOCUMENTS 4,330,175 A * 5/1982 Fujii et al. ............ 359/571
4,736,132 A * 4/1988 Culp .................... 310/333
(Continued)

FOREIGN PATENT DOCUMENTS

CN 100381865 C 4/2008
JP 08-202292 8/1996
(Continued)

OTHER PUBLICATIONS

International Search Report dated Nov. 1, 2011.
(Continued)

*Primary Examiner* — Michael J Eurice
(74) *Attorney, Agent, or Firm* — Dentons US LLP

(57) ABSTRACT

Provided are an illumination unit and a display capable of achieving size reduction in a case where a plurality types of light sources emitting light with various different wavelengths are in use. An optical-path conversion member 12 is provided for performing optical-path conversion to light (red laser light Lr, green laser light Lg, and blue laser light Lg) coming from three types of light sources (a red laser 11R, a green laser 11G, and a blue laser 11B) in a light source unit 11 in such a manner that, compared with an angle formed by center rays in the light, an angle formed by center rays in outgoing light becomes much smaller. Such optical-path conversion is performed without using a large-scale optical system (optical members).

16 Claims, 40 Drawing Sheets

(51) Int. Cl.

| | | |
|---|---|---|
| *G02B 27/10* | (2006.01) | |
| *G03B 21/20* | (2006.01) | |
| *G03B 21/00* | (2006.01) | |
| *G02B 5/18* | (2006.01) | |
| *F21V 8/00* | (2006.01) | |
| *G02B 27/14* | (2006.01) | |
| *H04N 9/31* | (2006.01) | |
| *G02B 27/00* | (2006.01) | |
| *G02B 27/28* | (2006.01) | |

(52) U.S. Cl.
CPC ......... *G02B 27/1086* (2013.01); *G02B 27/145* (2013.01); *G02B 27/149* (2013.01); *G03B 21/006* (2013.01); *G03B 21/2013* (2013.01); *G03B 21/2033* (2013.01); *H04N 9/3152* (2013.01); *H04N 9/3161* (2013.01); *G02B 27/286* (2013.01)

(56) References Cited

U.S. PATENT DOCUMENTS

| 5,751,452 | A  * | 5/1998  | Tanaka et al. ................ 349/33 |
|---|---|---|---|
| 5,942,157 | A  * | 8/1999  | Sutherland et al. ........... 252/582 |
| 6,115,152 | A  * | 9/2000  | Popovich et al. ............. 359/15 |
| 6,747,785 | B2 * | 6/2004  | Chen et al. .................... 359/291 |
| 2001/0019434 | A1 * | 9/2001  | Popovich et al. ............. 359/15 |
| 2003/0039036 | A1 * | 2/2003  | Kruschwitz et al. ......... 359/707 |
| 2004/0080807 | A1 * | 4/2004  | Chen et al. .................... 359/291 |
| 2004/0218390 | A1 * | 11/2004 | Holman et al. ................ 362/245 |
| 2004/0240777 | A1 * | 12/2004 | Woodgate et al. ............ 385/16 |
| 2005/0078374 | A1 * | 4/2005  | Taira et al. .................... 359/569 |
| 2005/0122487 | A1 * | 6/2005  | Koyama et al. ............... 353/94 |
| 2005/0237589 | A1 * | 10/2005 | Popovich et al. ............. 359/15 |
| 2006/0082560 | A1 * | 4/2006  | Greer et al. ................... 345/204 |
| 2006/0114533 | A1 * | 6/2006  | Sutherland et al. ........... 359/15 |
| 2007/0012777 | A1 * | 1/2007  | Tsikos et al. .................. 235/454 |
| 2008/0198456 | A1 * | 8/2008  | Sharp ............................ 359/499 |
| 2009/0023236 | A1 * | 1/2009  | Miyairi et al. ................ 438/30 |
| 2009/0026453 | A1 * | 1/2009  | Yamazaki ...................... 257/59 |
| 2009/0029508 | A1 * | 1/2009  | Yamazaki ...................... 438/158 |
| 2009/0047759 | A1 * | 2/2009  | Yamazaki et al. ............ 438/158 |
| 2009/0047761 | A1 * | 2/2009  | Yamazaki et al. ............ 438/158 |
| 2009/0137103 | A1 * | 5/2009  | Yamazaki ...................... 438/479 |
| 2009/0296049 | A1 * | 12/2009 | Teradaira et al. .............. 353/98 |
| 2010/0079359 | A1 * | 4/2010  | Kunoh et al. .................. 345/55 |
| 2010/0080001 | A1 * | 4/2010  | Kunoh et al. .................. 362/259 |
| 2010/0202725 | A1 * | 8/2010  | Popovich et al. ............. 385/10 |
| 2010/0284433 | A1 * | 11/2010 | Hata et al. ................. 372/45.011 |
| 2010/0290498 | A1 * | 11/2010 | Hata et al. .................. 372/50.12 |

FOREIGN PATENT DOCUMENTS

| JP | 09-258222 | 10/1997 |
|---|---|---|
| JP | 2002-182201 | 6/2002 |
| JP | 2003-330106 | 11/2003 |
| JP | 2007-327966 | 12/2007 |
| JP | 2007-333957 | 12/2007 |
| JP | 2008-191612 | 8/2008 |
| JP | 2008-304726 | 12/2008 |
| JP | 2009-180999 | 8/2009 |
| JP | 2009-188056 | 8/2009 |
| JP | 2010-166023 | 7/2010 |
| WO | 2007/116935 | 10/2007 |

OTHER PUBLICATIONS

Chinese Patent Office Action issued in connection with related Chinese Patent Application No. CN 201180005052.2 dated Dec. 18, 2013.

Japanese Office Examination Report issued in connection with related Japanese Patent Application No. JP 2012-526466 dated Feb. 10, 2015.

* cited by examiner

FIG. 11

(A) EXAMPLE 1-1

| | | |
|---|---|---|
| λb | 445 | nm |
| λg | 515 | nm |
| λr | 640 | nm |
| L | 3 | — |
| D | 720 | nm |
| P | 0.005 | mm |
| Δb | 0.268 | mm |
| Δg | 0.311 | mm |
| Δr | 0.387 | mm |
| nb | 1 | — |
| ng | 1 | — |
| nr | 1 | — |
| I(nb, D) | 0.71 | — |
| I(ng, D) | 0.81 | — |
| I(nr, D) | 0.72 | — |

(B) EXAMPLE 1-2

| | | |
|---|---|---|
| λb | 445 | nm |
| λg | 515 | nm |
| λr | 640 | nm |
| L | 3 | — |
| D | 13620 | nm |
| P | 0.005 | mm |
| Δb | -0.134 | mm |
| Δg | -0.311 | mm |
| Δr | -0.387 | mm |
| nb | -1 | — |
| ng | -1 | — |
| nr | -1 | — |
| I(nb, D) | 0.73 | — |
| I(ng, D) | 0.81 | — |
| I(nr, D) | 0.70 | — |

(C) EXAMPLE 1-3

| | | |
|---|---|---|
| λb | 445 | nm |
| λg | 515 | nm |
| λr | 640 | nm |
| L | 3 | — |
| D | 11450 | nm |
| P | 0.01 | mm |
| Δb | -0.134 | mm |
| Δg | 0.000 | mm |
| Δr | 0.192 | mm |
| nb | -1 | — |
| ng | 0 | — |
| nr | 1 | — |
| I(nb, D) | 0.73 | — |
| I(ng, D) | 1.00 | — |
| I(nr, D) | 0.71 | — |

EXAMPLE 1-4

| | | |
|---|---|---|
| λb | 445 | nm |
| λg | 515 | nm |
| λr | 640 | nm |
| L | 3 | — |
| D | 7880 | nm |
| P | 0.01 | mm |
| Δb | 0.134 | mm |
| Δg | -0.155 | mm |
| Δr | 0.192 | mm |
| nb | 1 | — |
| ng | -1 | — |
| nr | 1 | — |
| I(nb, D) | 0.71 | — |
| I(ng, D) | 0.81 | — |
| I(nr, D) | 0.72 | — |

EXAMPLE 1-5

| | | |
|---|---|---|
| λb | 445 | nm |
| λg | 515 | nm |
| λr | 640 | nm |
| L | 3 | — |
| D | 6450 | nm |
| P | 0.01 | mm |
| Δb | -0.134 | mm |
| Δg | 0.155 | mm |
| Δr | -0.192 | mm |
| nb | -1 | — |
| ng | 1 | — |
| nr | -1 | — |
| I(nb, D) | 0.72 | — |
| I(ng, D) | 0.81 | — |
| I(nr, D) | 0.71 | — |

EXAMPLE 1-6

| | | |
|---|---|---|
| λb | 445 | nm |
| λg | 515 | nm |
| λr | 640 | nm |
| L | 3 | — |
| D | 2860 | nm |
| P | 0.01 | mm |
| Δb | 0.134 | mm |
| Δg | 0.000 | mm |
| Δr | -0.192 | mm |
| nb | 1 | — |
| ng | 0 | — |
| nr | -1 | — |
| I(nb, D) | 0.71 | — |
| I(ng, D) | 1.00 | — |
| I(nr, D) | 0.72 | — |

(A) EXAMPLE 1-7

| λb | 445 | nm |
|---|---|---|
| λg | 515 | nm |
| λr | 640 | nm |

| L | 4 | — |
|---|---|---|
| D | 3820 | nm |
| P | 0.01 | mm |

| Δb | 0.134 | mm |
|---|---|---|
| Δg | 0.000 | mm |
| Δr | -0.192 | mm |

| nb | 1 | — |
|---|---|---|
| ng | 0 | — |
| nr | -1 | — |

| I(nb,D) | 0.88 | — |
|---|---|---|
| I(ng,D) | 1.00 | — |
| I(nr,D) | 0.88 | — |

(B) EXAMPLE 1-8

| λb | 445 | nm |
|---|---|---|
| λg | 515 | nm |
| λr | 640 | nm |

| L | 5 | — |
|---|---|---|
| D | 4800 | nm |
| P | 0.01 | mm |

| Δb | 0.134 | mm |
|---|---|---|
| Δg | 0.000 | mm |
| Δr | -0.192 | mm |

| nb | 1 | — |
|---|---|---|
| ng | 0 | — |
| nr | -1 | — |

| I(nb,D) | 0.76 | — |
|---|---|---|
| I(ng,D) | 1.00 | — |
| I(nr,D) | 0.83 | — |

(C) EXAMPLE 1-9

| λb | 445 | nm |
|---|---|---|
| λg | 515 | nm |
| λr | 640 | nm |

| L | 5 | — |
|---|---|---|
| D | 850 | nm |
| P | 0.005 | mm |

| Δb | 0.134 | mm |
|---|---|---|
| Δg | 0.155 | mm |
| Δr | 0.192 | mm |

| nb | 1 | — |
|---|---|---|
| ng | 1 | — |
| nr | 1 | — |

| I(nb,D) | 0.70 | — |
|---|---|---|
| I(ng,D) | 0.90 | — |
| I(nr,D) | 0.85 | — |

(D) EXAMPLE 1-10

| λb | 445 | nm |
|---|---|---|
| λg | 515 | nm |
| λr | 640 | nm |

| L | 6 | — |
|---|---|---|
| D | 13000 | nm |
| P | 0.01 | mm |

| Δb | -0.268 | mm |
|---|---|---|
| Δg | 0.311 | mm |
| Δr | -0.192 | mm |

| nb | -2 | — |
|---|---|---|
| ng | 2 | — |
| nr | -1 | — |

| I(nb,D) | 0.75 | — |
|---|---|---|
| I(ng,D) | 0.73 | — |
| I(nr,D) | 0.71 | — |

(E) EXAMPLE 1-11

| λb | 445 | nm |
|---|---|---|
| λg | 515 | nm |
| λr | 640 | nm |

| L | 6 | — |
|---|---|---|
| D | 4950 | nm |
| P | 0.01 | mm |

| Δb | 0.000 | mm |
|---|---|---|
| Δg | -0.155 | mm |
| Δr | -0.387 | mm |

| nb | 0 | — |
|---|---|---|
| ng | -1 | — |
| nr | -2 | — |

| I(nb,D) | 0.80 | — |
|---|---|---|
| I(ng,D) | 0.93 | — |
| I(nr,D) | 0.70 | — |

(F) EXAMPLE 1-12

| λb | 445 | nm |
|---|---|---|
| λg | 515 | nm |
| λr | 640 | nm |

| L | 7 | — |
|---|---|---|
| D | 6060 | nm |
| P | 0.01 | mm |

| Δb | 0.134 | mm |
|---|---|---|
| Δg | -0.155 | mm |
| Δr | -0.387 | mm |

| nb | 1 | — |
|---|---|---|
| ng | -1 | — |
| nr | -2 | — |

| I(nb,D) | 0.71 | — |
|---|---|---|
| I(ng,D) | 0.76 | — |
| I(nr,D) | 0.71 | — |

FIG. 25

(A) EXAMPLE 2-1

| | | |
|---|---|---|
| λb | 445 | nm |
| λg | 515 | nm |
| λr | 640 | nm |

| | | |
|---|---|---|
| L | — | — |
| D | 2170 | nm |
| P | 0.005 | mm |

| | | |
|---|---|---|
| Δb | 0.831 | mm |
| Δg | 0.632 | mm |
| Δr | 0.794 | mm |

| | | |
|---|---|---|
| nb | 3 | — |
| ng | 2 | — |
| nr | 2 | — |

| | | |
|---|---|---|
| I(nb, D) | 0.78 | — |
| I(ng, D) | 0.77 | — |
| I(nr, D) | 0.90 | — |

(B) EXAMPLE 2-2

| | | |
|---|---|---|
| λb | 445 | nm |
| λg | 515 | nm |
| λr | 640 | nm |

| | | |
|---|---|---|
| L | — | — |
| D | 2600 | nm |
| P | 0.005 | mm |

| | | |
|---|---|---|
| Δb | 0.831 | mm |
| Δg | 0.975 | mm |
| Δr | 0.794 | mm |

| | | |
|---|---|---|
| nb | 3 | — |
| ng | 3 | — |
| nr | 2 | — |

| | | |
|---|---|---|
| I(nb, D) | 0.78 | — |
| I(ng, D) | 0.78 | — |
| I(nr, D) | 0.90 | — |

(C) EXAMPLE 2-3

| | | |
|---|---|---|
| λb | 445 | nm |
| λg | 515 | nm |
| λr | 640 | nm |

| | | |
|---|---|---|
| L | — | — |
| D | 950 | nm |
| P | 0.005 | mm |

| | | |
|---|---|---|
| Δb | 0.268 | mm |
| Δg | 0.311 | mm |
| Δr | 0.387 | mm |

| | | |
|---|---|---|
| nb | 1 | — |
| ng | 1 | — |
| nr | 1 | — |

| | | |
|---|---|---|
| I(nb, D) | 0.88 | — |
| I(ng, D) | 1.00 | — |
| I(nr, D) | 0.87 | — |

FIG. 29

(A) EXAMPLE 3-1

| λb | 445 | nm |
|---|---|---|
| λg | 515 | nm |
| λr | 640 | nm |

| L | 3 | — |
|---|---|---|
| D | 2240 | nm |
| P | 0.01 | mm |

| Δb | 0.000 | mm |
|---|---|---|
| Δg | -0.155 | mm |
| Δr | — | mm |

| nb | 0 | — |
|---|---|---|
| ng | -1 | — |
| nr | — | — |

| I(nb,D) | 0.83 | — |
|---|---|---|
| I(ng,D) | 0.77 | — |
| I(nr,D) | — | — |

(B) EXAMPLE 3-2

| λb | 445 | nm |
|---|---|---|
| λg | 515 | nm |
| λr | 640 | nm |

| L | 3 | — |
|---|---|---|
| D | 2560 | nm |
| P | 0.01 | mm |

| Δb | 0.000 | mm |
|---|---|---|
| Δg | — | mm |
| Δr | -0.192 | mm |

| nb | 0 | — |
|---|---|---|
| ng | — | — |
| nr | -1 | — |

| I(nb,D) | 0.77 | — |
|---|---|---|
| I(ng,D) | — | — |
| I(nr,D) | 0.76 | — |

(C) EXAMPLE 3-3

| λb | 445 | nm |
|---|---|---|
| λg | 515 | nm |
| λr | 640 | nm |

| L | 3 | — |
|---|---|---|
| D | 2965 | nm |
| P | 0.01 | mm |

| Δb | 0.134 | mm |
|---|---|---|
| Δg | 0.000 | mm |
| Δr | — | mm |

| nb | 1 | — |
|---|---|---|
| ng | 0 | — |
| nr | — | — |

| I(nb,D) | 0.81 | — |
|---|---|---|
| I(ng,D) | 0.94 | — |
| I(nr,D) | — | — |

(D) EXAMPLE 3-4

| λb | 445 | nm |
|---|---|---|
| λg | 515 | nm |
| λr | 640 | nm |

| L | 3 | — |
|---|---|---|
| D | 3600 | nm |
| P | 0.01 | mm |

| Δb | — | mm |
|---|---|---|
| Δg | 0.155 | mm |
| Δr | 0.000 | mm |

| nb | — | — |
|---|---|---|
| ng | 1 | — |
| nr | 0 | — |

| I(nb,D) | — | — |
|---|---|---|
| I(ng,D) | 0.81 | — |
| I(nr,D) | 1.00 | — |

(E) EXAMPLE 3-5

| λb | 445 | nm |
|---|---|---|
| λg | 515 | nm |
| λr | 640 | nm |

| L | 3 | — |
|---|---|---|
| D | 4300 | nm |
| P | 0.01 | mm |

| Δb | -0.134 | mm |
|---|---|---|
| Δg | — | mm |
| Δr | 0.192 | mm |

| nb | -1 | — |
|---|---|---|
| ng | — | — |
| nr | 1 | — |

| I(nb,D) | 0.71 | — |
|---|---|---|
| I(ng,D) | — | — |
| I(nr,D) | 0.72 | — |

(F) EXAMPLE 3-6

| λb | 445 | nm |
|---|---|---|
| λg | 515 | nm |
| λr | 640 | nm |

| L | 3 | — |
|---|---|---|
| D | 4930 | nm |
| P | 0.01 | mm |

| Δb | 0.000 | mm |
|---|---|---|
| Δg | -0.155 | mm |
| Δr | — | mm |

| nb | 0 | — |
|---|---|---|
| ng | -1 | — |
| nr | — | — |

| I(nb,D) | 0.81 | — |
|---|---|---|
| I(ng,D) | 0.78 | — |
| I(nr,D) | — | — |

FIG. 30

(A) EXAMPLE 3-7

| λb | 445 | nm |
|---|---|---|
| λg | 515 | nm |
| λr | 640 | nm |

| L | 3 | — |
|---|---|---|
| D | 5490 | nm |
| P | 0.01 | mm |

| Δb | 0.134 | mm |
|---|---|---|
| Δg | 0.000 | mm |
| Δr | — | mm |

| nb | 1 | — |
|---|---|---|
| ng | 0 | — |
| nr | — | — |

| I(nb, D) | 0.72 | — |
|---|---|---|
| I(ng, D) | 0.71 | — |
| I(nr, D) | — | — |

(B) EXAMPLE 3-8

| λb | 445 | nm |
|---|---|---|
| λg | 515 | nm |
| λr | 640 | nm |

| L | 3 | — |
|---|---|---|
| D | 6500 | nm |
| P | 0.01 | mm |

| Δb | -0.134 | mm |
|---|---|---|
| Δg | 0.155 | mm |
| Δr | — | mm |

| nb | -1 | — |
|---|---|---|
| ng | 1 | — |
| nr | — | — |

| I(nb, D) | 0.78 | — |
|---|---|---|
| I(ng, D) | 0.79 | — |
| I(nr, D) | — | — |

(C) EXAMPLE 3-9

| λb | 445 | nm |
|---|---|---|
| λg | 515 | nm |
| λr | 640 | nm |

| L | 3 | — |
|---|---|---|
| D | 7810 | nm |
| P | 0.01 | mm |

| Δb | 0.134 | mm |
|---|---|---|
| Δg | -0.155 | mm |
| Δr | — | mm |

| nb | 1 | — |
|---|---|---|
| ng | -1 | — |
| nr | — | — |

| I(nb, D) | 0.79 | — |
|---|---|---|
| I(ng, D) | 0.79 | — |
| I(nr, D) | — | — |

(D) EXAMPLE 3-10

| λb | 445 | nm |
|---|---|---|
| λg | 515 | nm |
| λr | 640 | nm |

| L | 3 | — |
|---|---|---|
| D | 9380 | nm |
| P | 0.01 | mm |

| Δb | 0.000 | mm |
|---|---|---|
| Δg | 0.155 | mm |
| Δr | — | mm |

| nb | 0 | — |
|---|---|---|
| ng | 1 | — |
| nr | — | — |

| I(nb, D) | 0.77 | — |
|---|---|---|
| I(ng, D) | 0.78 | — |
| I(nr, D) | — | — |

(E) EXAMPLE 3-11

| λb | 445 | nm |
|---|---|---|
| λg | 515 | nm |
| λr | 640 | nm |

| L | 3 | — |
|---|---|---|
| D | 10030 | nm |
| P | 0.01 | mm |

| Δb | 0.134 | mm |
|---|---|---|
| Δg | — | mm |
| Δr | -0.192 | mm |

| nb | 1 | — |
|---|---|---|
| ng | — | — |
| nr | -1 | — |

| I(nb, D) | 0.72 | — |
|---|---|---|
| I(ng, D) | — | — |
| I(nr, D) | 0.71 | — |

(F) EXAMPLE 3-12

| λb | 445 | nm |
|---|---|---|
| λg | 515 | nm |
| λr | 640 | nm |

| L | 3 | — |
|---|---|---|
| D | 10750 | nm |
| P | 0.01 | mm |

| Δb | — | mm |
|---|---|---|
| Δg | -0.155 | mm |
| Δr | 0.000 | mm |

| nb | — | — |
|---|---|---|
| ng | -1 | — |
| nr | 0 | — |

| I(nb, D) | — | — |
|---|---|---|
| I(ng, D) | 0.81 | — |
| I(nr, D) | 1.00 | — |

FIG. 31

(A) EXAMPLE 3-13

| | | |
|---|---|---|
| λb | 445 | nm |
| λg | 515 | nm |
| λr | 640 | nm |

| | | |
|---|---|---|
| L | 3 | — |
| D | 11340 | nm |
| P | 0.01 | mm |

| | | |
|---|---|---|
| Δb | -0.134 | mm |
| Δg | 0.000 | mm |
| Δr | — | mm |

| | | |
|---|---|---|
| nb | -1 | — |
| ng | 0 | — |
| nr | — | — |

| | | |
|---|---|---|
| I(nb,D) | 0.81 | — |
| I(ng,D) | 0.93 | — |
| I(nr,D) | — | — |

(B) EXAMPLE 3-14

| | | |
|---|---|---|
| λb | 445 | nm |
| λg | 515 | nm |
| λr | 640 | nm |

| | | |
|---|---|---|
| L | 3 | — |
| D | 11600 | nm |
| P | 0.01 | mm |

| | | |
|---|---|---|
| Δb | — | mm |
| Δg | 0.000 | mm |
| Δr | 0.192 | mm |

| | | |
|---|---|---|
| nb | — | — |
| ng | 0 | — |
| nr | 1 | — |

| | | |
|---|---|---|
| I(nb,D) | — | — |
| I(ng,D) | 0.87 | — |
| I(nr,D) | 0.81 | — |

(C) EXAMPLE 3-15

| | | |
|---|---|---|
| λb | 445 | nm |
| λg | 515 | nm |
| λr | 640 | nm |

| | | |
|---|---|---|
| L | 3 | — |
| D | 12100 | nm |
| P | 0.01 | mm |

| | | |
|---|---|---|
| Δb | 0.000 | mm |
| Δg | 0.155 | mm |
| Δr | — | mm |

| | | |
|---|---|---|
| nb | 0 | — |
| ng | 1 | — |
| nr | — | — |

| | | |
|---|---|---|
| I(nb,D) | 0.79 | — |
| I(ng,D) | 0.79 | — |
| I(nr,D) | — | — |

(D) EXAMPLE 3-16

| | | |
|---|---|---|
| λb | 445 | nm |
| λg | 515 | nm |
| λr | 640 | nm |

| | | |
|---|---|---|
| L | 3 | — |
| D | 13660 | nm |
| P | 0.005 | mm |

| | | |
|---|---|---|
| Δb | -0.268 | mm |
| Δg | -0.311 | mm |
| Δr | — | mm |

| | | |
|---|---|---|
| nb | -1 | — |
| ng | -1 | — |
| nr | — | — |

| | | |
|---|---|---|
| I(nb,D) | 0.78 | — |
| I(ng,D) | 0.79 | — |
| I(nr,D) | — | — |

(E) EXAMPLE 3-17

| | | |
|---|---|---|
| λb | 445 | nm |
| λg | 515 | nm |
| λr | 640 | nm |

| | | |
|---|---|---|
| L | 4 | — |
| D | 3100 | nm |
| P | 0.01 | mm |

| | | |
|---|---|---|
| Δb | 0.000 | mm |
| Δg | -0.155 | mm |
| Δr | — | mm |

| | | |
|---|---|---|
| nb | 0 | — |
| ng | -1 | — |
| nr | — | — |

| | | |
|---|---|---|
| I(nb,D) | 0.95 | — |
| I(ng,D) | 0.86 | — |
| I(nr,D) | — | — |

(F) EXAMPLE 3-18

| | | |
|---|---|---|
| λb | 445 | nm |
| λg | 515 | nm |
| λr | 640 | nm |

| | | |
|---|---|---|
| L | 4 | — |
| D | 4600 | nm |
| P | 0.01 | mm |

| | | |
|---|---|---|
| Δb | — | mm |
| Δg | 0.155 | mm |
| Δr | 0.000 | mm |

| | | |
|---|---|---|
| nb | — | — |
| ng | 1 | — |
| nr | 0 | — |

| | | |
|---|---|---|
| I(nb,D) | — | — |
| I(ng,D) | 0.87 | — |
| I(nr,D) | 0.90 | — |

FIG. 32

(A) EXAMPLE 3-19

| λb | 445 | nm |
|---|---|---|
| λg | 515 | nm |
| λr | 640 | nm |

| L | 4 | — |
|---|---|---|
| D | 5700 | nm |
| P | 0.01 | mm |

| Δb | -0.134 | mm |
|---|---|---|
| Δg | — | mm |
| Δr | 0.192 | mm |

| nb | -1 | — |
|---|---|---|
| ng | — | — |
| nr | 1 | — |

| I(nb, D) | 0.87 | — |
|---|---|---|
| I(ng, D) | — | — |
| I(nr, D) | 0.87 | — |

(B) EXAMPLE 3-20

| λb | 445 | nm |
|---|---|---|
| λg | 515 | nm |
| λr | 640 | nm |

| L | 4 | — |
|---|---|---|
| D | 6950 | nm |
| P | 0.01 | mm |

| Δb | 0.134 | mm |
|---|---|---|
| Δg | -0.155 | mm |
| Δr | — | mm |

| nb | 1 | — |
|---|---|---|
| ng | -1 | — |
| nr | — | — |

| I(nb, D) | 0.86 | — |
|---|---|---|
| I(ng, D) | 0.85 | — |
| I(nr, D) | — | — |

(C) EXAMPLE 3-21

| λb | 445 | nm |
|---|---|---|
| λg | 515 | nm |
| λr | 640 | nm |

| L | 4 | — |
|---|---|---|
| D | 8550 | nm |
| P | 0.01 | mm |

| Δb | — | mm |
|---|---|---|
| Δg | 0.155 | mm |
| Δr | -0.192 | mm |

| nb | — | — |
|---|---|---|
| ng | 1 | — |
| nr | -1 | — |

| I(nb, D) | — | — |
|---|---|---|
| I(ng, D) | 0.77 | — |
| I(nr, D) | 0.87 | — |

EXAMPLE 3-22

| λb | 445 | nm |
|---|---|---|
| λg | 515 | nm |
| λr | 640 | nm |

| L | 4 | — |
|---|---|---|
| D | 8800 | nm |
| P | 0.01 | mm |

| Δb | -0.134 | mm |
|---|---|---|
| Δg | — | mm |
| Δr | -0.192 | mm |

| nb | -1 | — |
|---|---|---|
| ng | — | — |
| nr | -1 | — |

| I(nb, D) | 0.79 | — |
|---|---|---|
| I(ng, D) | — | — |
| I(nr, D) | 0.75 | — |

(D)

EXAMPLE 3-23

| λb | 445 | nm |
|---|---|---|
| λg | 515 | nm |
| λr | 640 | nm |

| L | 4 | — |
|---|---|---|
| D | 10310 | nm |
| P | 0.01 | mm |

| Δb | 0.134 | mm |
|---|---|---|
| Δg | — | mm |
| Δr | 0.192 | mm |

| nb | 1 | — |
|---|---|---|
| ng | — | — |
| nr | 1 | — |

| I(nb, D) | 0.78 | — |
|---|---|---|
| I(ng, D) | — | — |
| I(nr, D) | 0.77 | — |

(E)

EXAMPLE 3-24

| λb | 445 | nm |
|---|---|---|
| λg | 515 | nm |
| λr | 640 | nm |

| L | 4 | — |
|---|---|---|
| D | 10630 | nm |
| P | 0.01 | mm |

| Δb | — | mm |
|---|---|---|
| Δg | -0.155 | mm |
| Δr | 0.192 | mm |

| nb | — | — |
|---|---|---|
| ng | -1 | — |
| nr | 1 | — |

| I(nb, D) | — | — |
|---|---|---|
| I(ng, D) | 0.86 | — |
| I(nr, D) | 0.83 | — |

(A) EXAMPLE 3-25

| | | |
|---|---|---|
| λb | 445 | nm |
| λg | 515 | nm |
| λr | 640 | nm |

| | | |
|---|---|---|
| L | 4 | — |
| D | 13400 | nm |
| P | 0.01 | mm |

| | | |
|---|---|---|
| Δb | 0.134 | mm |
| Δg | — | mm |
| Δr | -0.192 | mm |

| | | |
|---|---|---|
| nb | 1 | — |
| ng | — | — |
| nr | -1 | — |

| | | |
|---|---|---|
| I(nb, D) | 0.87 | — |
| I(ng, D) | — | — |
| I(nr, D) | 0.87 | — |

(B) EXAMPLE 3-26

| | | |
|---|---|---|
| λb | 445 | nm |
| λg | 515 | nm |
| λr | 640 | nm |

| | | |
|---|---|---|
| L | 4 | — |
| D | 14500 | nm |
| P | 0.01 | mm |

| | | |
|---|---|---|
| Δb | — | mm |
| Δg | -0.155 | mm |
| Δr | 0.000 | mm |

| | | |
|---|---|---|
| nb | — | — |
| ng | -1 | — |
| nr | 0 | — |

| | | |
|---|---|---|
| I(nb, D) | — | — |
| I(ng, D) | 0.88 | — |
| I(nr, D) | 0.89 | — |

(C) EXAMPLE 3-27

| | | |
|---|---|---|
| λb | 445 | nm |
| λg | 515 | nm |
| λr | 640 | nm |

| | | |
|---|---|---|
| L | 5 | — |
| D | 4000 | nm |
| P | 0.01 | mm |

| | | |
|---|---|---|
| Δb | 0.000 | mm |
| Δg | -0.155 | mm |
| Δr | — | mm |

| | | |
|---|---|---|
| nb | 0 | — |
| ng | -1 | — |
| nr | — | — |

| | | |
|---|---|---|
| I(nb, D) | 1.00 | — |
| I(ng, D) | 0.91 | — |
| I(nr, D) | — | — |

EXAMPLE 3-28

| | | |
|---|---|---|
| λb | 445 | nm |
| λg | 515 | nm |
| λr | 640 | nm |

| | | |
|---|---|---|
| L | 5 | — |
| D | 4650 | nm |
| P | 0.01 | mm |

| | | |
|---|---|---|
| Δb | 0.134 | mm |
| Δg | 0.000 | mm |
| Δr | — | mm |

| | | |
|---|---|---|
| nb | 1 | — |
| ng | 0 | — |
| nr | — | — |

| | | |
|---|---|---|
| I(nb, D) | 0.91 | — |
| I(ng, D) | 0.93 | — |
| I(nr, D) | — | — |

EXAMPLE 3-29

| | | |
|---|---|---|
| λb | 445 | nm |
| λg | 515 | nm |
| λr | 640 | nm |

| | | |
|---|---|---|
| L | 5 | — |
| D | 4950 | nm |
| P | 0.01 | mm |

| | | |
|---|---|---|
| Δb | — | mm |
| Δg | 0.000 | mm |
| Δr | -0.192 | mm |

| | | |
|---|---|---|
| nb | — | — |
| ng | 0 | — |
| nr | -1 | — |

| | | |
|---|---|---|
| I(nb, D) | — | — |
| I(ng, D) | 0.85 | — |
| I(nr, D) | 0.91 | — |

EXAMPLE 3-30

| | | |
|---|---|---|
| λb | 445 | nm |
| λg | 515 | nm |
| λr | 640 | nm |

| | | |
|---|---|---|
| L | 5 | — |
| D | 5720 | nm |
| P | 0.01 | mm |

| | | |
|---|---|---|
| Δb | — | mm |
| Δg | 0.155 | mm |
| Δr | 0.000 | mm |

| | | |
|---|---|---|
| nb | — | — |
| ng | 1 | — |
| nr | 0 | — |

| | | |
|---|---|---|
| I(nb, D) | — | — |
| I(ng, D) | 0.81 | — |
| I(nr, D) | 0.82 | — |

(A) EXAMPLE 3-31

| | | |
|---|---|---|
| λb | 445 | nm |
| λg | 515 | nm |
| λr | 640 | nm |
| L | 5 | — |
| D | 7160 | nm |
| P | 0.01 | mm |
| Δb | -0.134 | mm |
| Δg | — | mm |
| Δr | 0.192 | mm |
| nb | -1 | — |
| ng | — | — |
| nr | 1 | — |
| I(nb,D) | 0.80 | — |
| I(ng,D) | — | — |
| I(nr,D) | 0.80 | — |

(B) EXAMPLE 3-32

| | | |
|---|---|---|
| λb | 445 | nm |
| λg | 515 | nm |
| λr | 640 | nm |
| L | 5 | — |
| D | 8750 | nm |
| P | 0.01 | mm |
| Δb | 0.134 | mm |
| Δg | -0.155 | mm |
| Δr | — | mm |
| nb | 1 | — |
| ng | -1 | — |
| nr | — | — |
| I(nb,D) | 0.81 | — |
| I(ng,D) | 0.91 | — |
| I(nr,D) | — | — |

(C) EXAMPLE 3-33

| | | |
|---|---|---|
| λb | 445 | nm |
| λg | 515 | nm |
| λr | 640 | nm |
| L | 5 | — |
| D | 11140 | nm |
| P | 0.01 | mm |
| Δb | -0.134 | mm |
| Δg | — | mm |
| Δr | -0.192 | mm |
| nb | -1 | — |
| ng | — | — |
| nr | -1 | — |
| I(nb,D) | 0.80 | — |
| I(ng,D) | — | — |
| I(nr,D) | 0.80 | — |

(D) EXAMPLE 3-34

| | | |
|---|---|---|
| λb | 445 | nm |
| λg | 515 | nm |
| λr | 640 | nm |
| L | 5 | — |
| D | 12730 | nm |
| P | 0.01 | mm |
| Δb | 0.134 | mm |
| Δg | — | mm |
| Δr | 0.192 | mm |
| nb | 1 | — |
| ng | — | — |
| nr | 1 | — |
| I(nb,D) | 0.80 | — |
| I(ng,D) | — | — |
| I(nr,D) | 0.80 | — |

FIG. 39

(A) EXAMPLE 4-1

| | | |
|---|---|---|
| λb | 445 | nm |
| λg | 515 | nm |
| λr | 640 | nm |

| | | |
|---|---|---|
| L | — | — |
| D | 1430 | nm |
| P | 0.005 | mm |

| | | |
|---|---|---|
| Δb | 0.543 | mm |
| Δg | — | mm |
| Δr | 0.387 | mm |

| | | |
|---|---|---|
| nb | 2 | — |
| ng | — | — |
| nr | 1 | — |

| | | |
|---|---|---|
| I(nb,D) | 0.87 | — |
| I(ng,D) | — | — |
| I(nr,D) | 0.88 | — |

(B) EXAMPLE 4-2

| | | |
|---|---|---|
| λb | 445 | nm |
| λg | 515 | nm |
| λr | 640 | nm |

| | | |
|---|---|---|
| L | — | — |
| D | 1730 | nm |
| P | 0.005 | mm |

| | | |
|---|---|---|
| Δb | 0.543 | mm |
| Δg | 0.632 | mm |
| Δr | — | mm |

| | | |
|---|---|---|
| nb | 2 | — |
| ng | 2 | — |
| nr | 0 | — |

| | | |
|---|---|---|
| I(nb,D) | 0.90 | — |
| I(ng,D) | 0.89 | — |
| I(nr,D) | — | — |

(C) EXAMPLE 4-3

| | | |
|---|---|---|
| λb | 445 | nm |
| λg | 515 | nm |
| λr | 640 | nm |

| | | |
|---|---|---|
| L | — | — |
| D | 2120 | nm |
| P | 0.005 | mm |

| | | |
|---|---|---|
| Δb | — | mm |
| Δg | 0.632 | mm |
| Δr | 0.794 | mm |

| | | |
|---|---|---|
| nb | 0 | — |
| ng | 2 | — |
| nr | 2 | — |

| | | |
|---|---|---|
| I(nb,D) | — | — |
| I(ng,D) | 0.85 | — |
| I(nr,D) | 0.85 | — |

(D) EXAMPLE 4-4

| | | |
|---|---|---|
| λb | 445 | nm |
| λg | 515 | nm |
| λr | 640 | nm |

| | | |
|---|---|---|
| L | — | — |
| D | 2380 | nm |
| P | 0.005 | mm |

| | | |
|---|---|---|
| Δb | 0.831 | mm |
| Δg | — | mm |
| Δr | 0.794 | mm |

| | | |
|---|---|---|
| nb | 3 | — |
| ng | — | — |
| nr | 2 | — |

| | | |
|---|---|---|
| I(nb,D) | 1.00 | — |
| I(ng,D) | — | — |
| I(nr,D) | 1.00 | — |

(E) EXAMPLE 4-5

| | | |
|---|---|---|
| λb | 445 | nm |
| λg | 515 | nm |
| λr | 640 | nm |

| | | |
|---|---|---|
| L | — | — |
| D | 2680 | nm |
| P | 0.005 | mm |

| | | |
|---|---|---|
| Δb | — | mm |
| Δg | 0.975 | mm |
| Δr | 0.794 | mm |

| | | |
|---|---|---|
| nb | — | — |
| ng | 3 | — |
| nr | 2 | — |

| | | |
|---|---|---|
| I(nb,D) | — | — |
| I(ng,D) | 0.89 | — |
| I(nr,D) | 0.81 | — |

(F) EXAMPLE 4-6

| | | |
|---|---|---|
| λb | 445 | nm |
| λg | 515 | nm |
| λr | 640 | nm |

| | | |
|---|---|---|
| L | — | — |
| D | 3035 | nm |
| P | 0.005 | mm |

| | | |
|---|---|---|
| Δb | 1.143 | mm |
| Δg | 0.975 | mm |
| Δr | — | mm |

| | | |
|---|---|---|
| nb | 4 | — |
| ng | 3 | — |
| nr | — | — |

| | | |
|---|---|---|
| I(nb,D) | 0.90 | — |
| I(ng,D) | 0.89 | — |
| I(nr,D) | — | — |

FIG. 40

(A) EXAMPLE 4-7

| | | |
|---|---|---|
| λb | 445 | nm |
| λg | 515 | nm |
| λr | 640 | nm |

| | | |
|---|---|---|
| L | — | — |
| D | 3340 | nm |
| P | 0.005 | mm |

| | | |
|---|---|---|
| Δb | 1.143 | mm |
| Δg | — | mm |
| Δr | 1.248 | mm |

| | | |
|---|---|---|
| nb | 4 | — |
| ng | — | — |
| nr | 3 | — |

| | | |
|---|---|---|
| I(nb, D) | 0.87 | — |
| I(ng, D) | — | — |
| I(nr, D) | 0.88 | — |

(B) EXAMPLE 4-8

| | | |
|---|---|---|
| λb | 445 | nm |
| λg | 515 | nm |
| λr | 640 | nm |

| | | |
|---|---|---|
| L | — | — |
| D | 3710 | nm |
| P | 0.005 | mm |

| | | |
|---|---|---|
| Δb | — | mm |
| Δg | 1.356 | mm |
| Δr | 1.248 | mm |

| | | |
|---|---|---|
| nb | 0 | — |
| ng | 4 | — |
| nr | 3 | — |

| | | |
|---|---|---|
| I(nb, D) | — | — |
| I(ng, D) | 0.96 | — |
| I(nr, D) | 0.96 | — |

FIG. 41
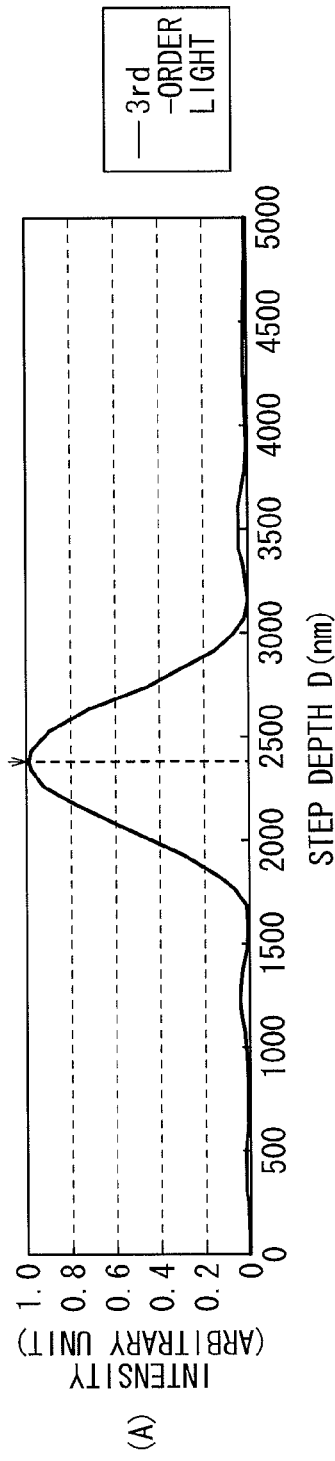
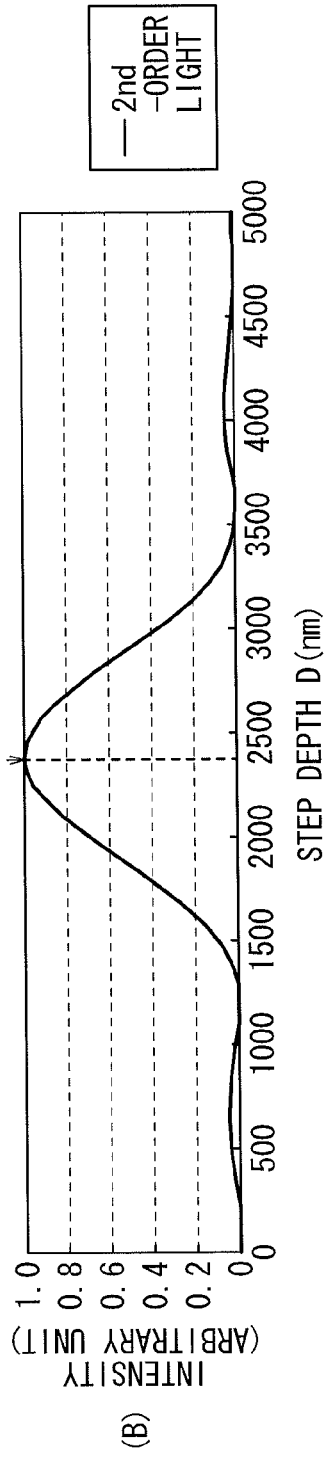

FIG. 42
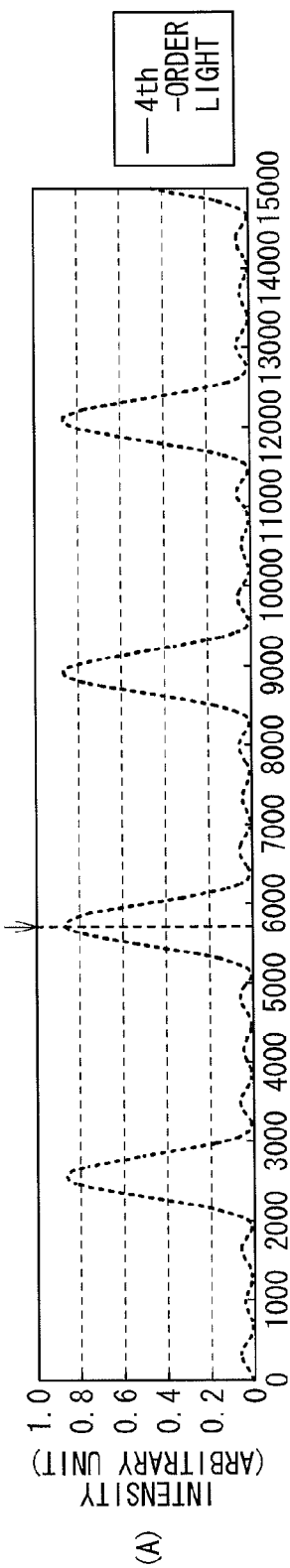
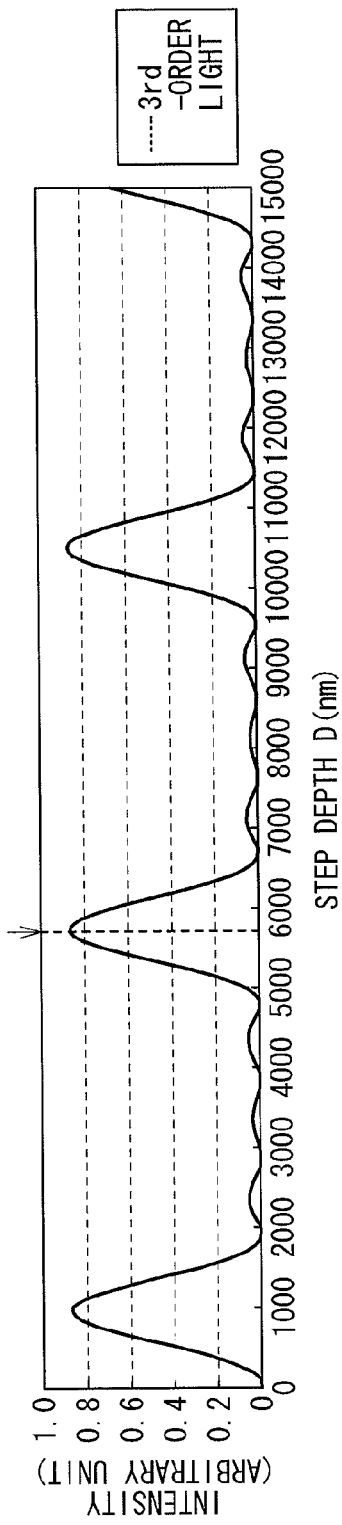

ILLUMINATION UNIT AND DISPLAY

TECHNICAL FIELD

The present invention relates to an illumination unit including a plurality types of light sources that emit light with various different wavelengths, and a display performing video display using such an illumination unit.

BACKGROUND ART

An optical module being one main component in a projector (projection-type display) is generally configured by an illumination optical system including a light source (an illumination unit), and a projection optical system including a light modulation device (a projection optical system). In the field of such a projector, in recent years, a small-sized (palm-sized) light-weight portable projector called micro-projector is becoming popular. In this micro-projector, previously, an LED (Light Emitting Diode) has been mainly used as the light source of an illumination unit.

On the other hand, recently, as a new light source for an illumination unit, a laser is receiving attention. For example, after commercialization of high-power blue and red semiconductor lasers, a green semiconductor laser has also been under development and is almost at the practical-use level. With the background as such, proposed is a projector using single-color lasers (semiconductor lasers) emitting light respectively in three primary colors of red (R), green (G), and blue (B) as the light source of an illumination unit (for example, see Patent Literatures 1 and 2). By using the single-color lasers as the light source, obtained is the projector having a wide range of color reproduction and reduced power consumption.

CITATION LIST

Patent Literature

Patent Literature 1: Japanese Unexamined Patent Application Publication No. 2009-188056
Patent Literature 2: PCT International Publication No. WO2007/116935

SUMMARY OF INVENTION

With the illumination unit in the previous projector described above, however, a large-scale (large-sized) optical system (optical members) has been needed to be constructed in order to use the light emitted from the single-color lasers respectively in three primary colors for video display after optical-path synthesis (color synthesis) thereof. To be specific, optical members including a high-NA lens, a dichroic prism, a dichroic mirror, and others have been needed to be used, for example. Therefore, with the previous illumination unit, since a large space has been needed for physically placing these optical members, this has been a cause of preventing the further size reduction (weight reduction) of the projector.

The present invention is proposed in consideration of such problems, and an object thereof is to provide an illumination unit and a display capable of achieving size reduction in a case where a plurality types of light sources emitting light with various different wavelengths are in use.

An illumination unit of the present invention includes a light source section provided with a plurality types of light sources emitting light with various different wavelengths, and an optical-path conversion member performing optical-path conversion to incoming light in such a manner that, compared with an angle formed by center rays in the incoming light from the plurality types of light sources, an angle formed by center rays in outgoing light becomes much smaller.

A display of the present invention includes the illumination unit of the present invention described above, and a light modulation device modulating illumination light from this illumination unit based on an image signal.

With the illumination unit and the display of the present invention, the optical-path conversion is performed to the light with various different wavelengths entered the optical-path conversion member from the plurality types of light sources in the light source section in such a manner that the angle formed by the center rays thereof becomes much smaller, and the light is emitted from the optical-path conversion member. In other words, without using a large-scale optical system (optical members) as has previously been used, the light emitted from each of the plurality types of light sources is subjected to the optical-path conversion (for example, color synthesis and optical-path synthesis) in such a manner that the angle formed by the center rays thereof becomes much smaller, and then the light is emitted.

According to the illumination unit and the display of the present invention, with the provision of the optical-path conversion member performing the optical-path conversion to the light coming from the plurality types of light sources in such a manner that, compared with the angle formed by center rays in the light, the angle formed by the center rays in outgoing light becomes much smaller, such optical-path conversion is performed without using a large-scale optical system (optical members). Therefore, when a plurality types of light sources emitting light with various different wavelengths are used, the size reduction is achievable.

BRIEF DESCRIPTION OF DRAWINGS

FIG. 11 is a diagram showing parameters of an optical-path conversion member according to examples 1-1 to 1-6.

FIG. 12 is a diagram showing parameters of an optical-path conversion member according to examples 1-7 to 1-12.

FIG. 25 is a diagram showing parameters of an optical-path conversion member according to examples 2-1 to 2-3.

FIG. 29 is a diagram showing parameters of an optical-path conversion member according to examples 3-1 to 3-6.

FIG. 30 is a diagram showing parameters of an optical-path conversion member according to examples 3-7 to 3-12.

FIG. 31 is a diagram showing parameters of an optical-path conversion member according to examples 3-13 to 3-18.

FIG. 32 is a diagram showing parameters of an optical-path conversion member according to examples 3-19 to 3-24.

FIG. 33 is a diagram showing parameters of an optical-path conversion member according to examples 3-25 to 3-30.

FIG. 34 is a diagram showing parameters of an optical-path conversion member according to examples 3-31 to 3-34.

FIG. 39 is a diagram showing parameters of an optical-path conversion member according to examples 4-1 to 4-6.

FIG. 40 is a diagram showing parameters of an optical-path conversion member according to examples 4-7 and 4-8.

FIG. 41 is a diagram showing the diffraction efficiency characteristics of the optical-path conversion member according to the example 4-4.

FIG. 42 is a diagram showing the diffraction efficiency characteristics of the optical-path conversion member according to the example 4-8.

DESCRIPTION OF EMBODIMENTS

Figure 1:
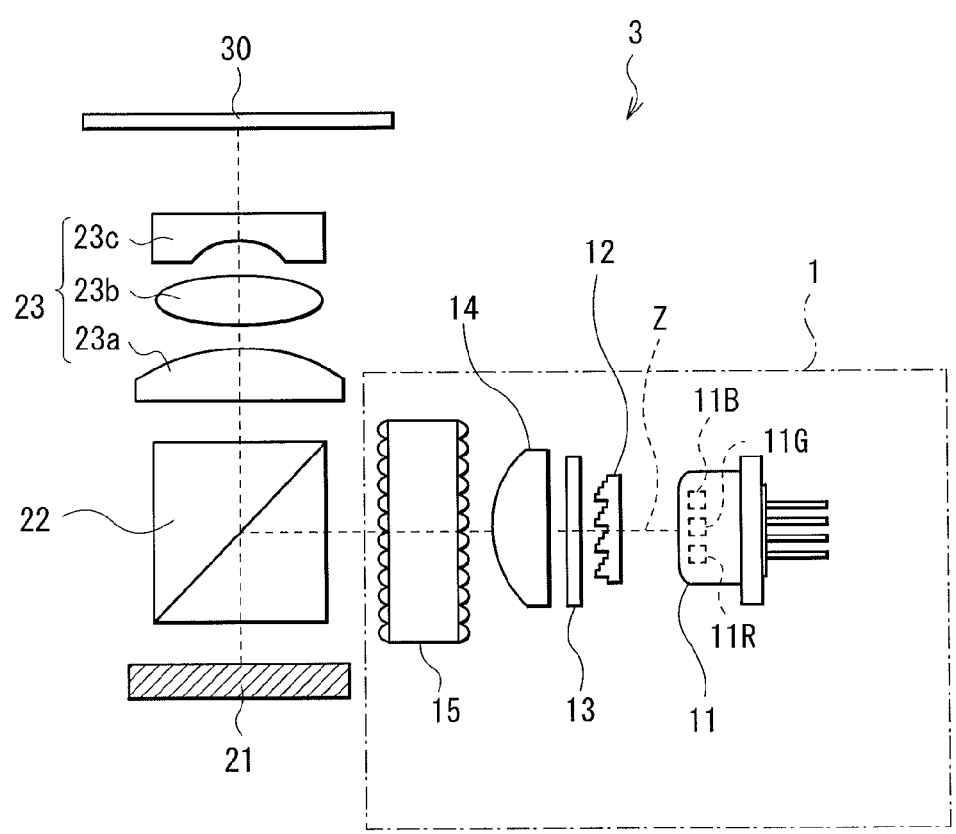
FIG. 1 is a diagram showing the entire configuration of a display according to a first embodiment of the present invention.

In the below, embodiments of the present invention are described in detail by referring to the drawings. Note that the description is given in the following order.
1. First Embodiment (Example of using a reflective liquid crystal device as a light modulation device)
2. Second Embodiment (Example of using a DMD as a light modulation device)
3. Modification Examples Common to First and Second Embodiments
   Modification Example 1 (Example in which a light source is placed with a tilt against the optical axis in a light source unit)
   Modification Example 2 (Example of using an optical-path conversion member in any other diffraction grating structure (blazed structure))
4. Examples
   Examples 1-1 to 1-12 (Examples with an optical-path conversion member in the step structure, and three types of light sources)
   Examples 2-1 to 2-3 (Examples with an optical-path conversion member in the blazed structure, and three types of light sources)
   Examples 3-1 to 3-34 (Examples with an optical-path conversion member in the step structure, and two types of light sources)
   Examples 4-1 to 4-8 (Examples with an optical-path conversion member in the blazed structure, and two types of light sources)
5. Other Modification Examples First Embodiment Entire Configuration of Display 3

FIG. 1 is a diagram showing the entire configuration of a display (a display 3) according to a first embodiment of the present invention. This display 3 is a projection-type display that projects video (video light) with respect to a screen 30 (projection surface), and includes an illumination unit 1, and an optical system (a display optical system) for performing video display using illumination light from this illumination unit 1.

(Illumination Unit 1)

The illumination unit 1 includes, in order along an optical axis Z shown in the drawing, a light source unit 11 (a light source section), an optical-path conversion member 12, a retardation film (wave plate) 13, a collimator lens 14, and a fly-eye lens 15.

Figure 2:
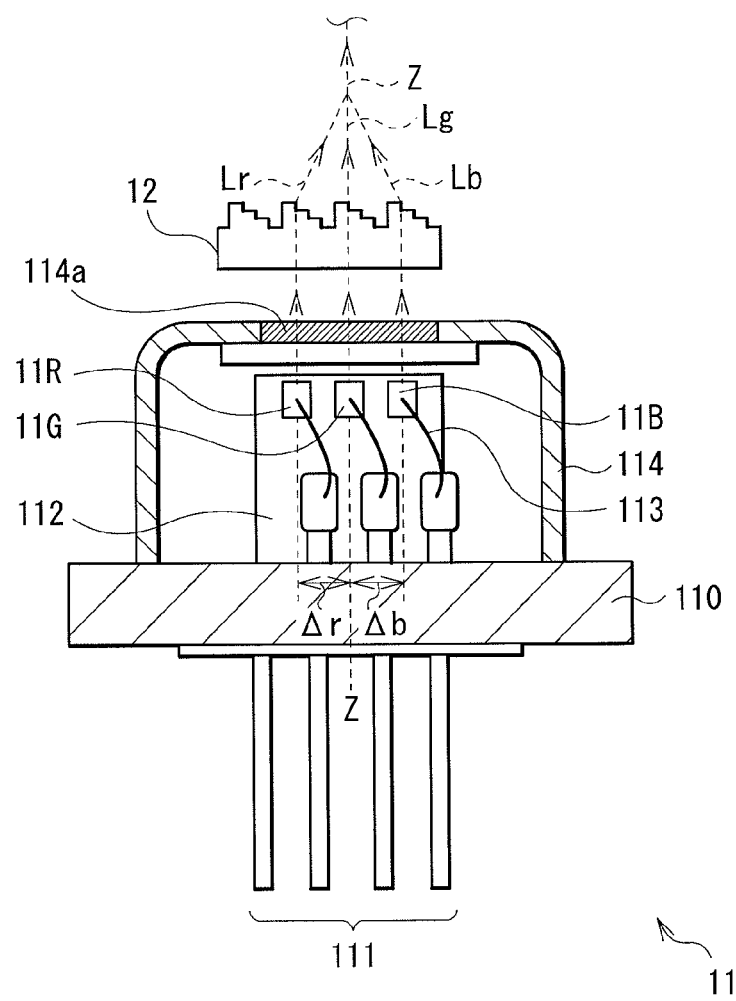
FIG. 2 is a schematic cross-sectional diagram showing the detailed configuration of a light source unit shown in FIG. 1 together with an optical-path conversion member.

The light source unit 11 is configured to include a red laser 11R, a green laser 11G, and a blue laser 11B, which are three types of light sources emitting light with various different wavelengths. These lasers are configured by semiconductor lasers or solid lasers, for example. With such lasers, as will be described later, the shape of a far field pattern (FFP) of the laser light to be emitted therefrom is the in-plane anisotropic shape (oval, for example). In other words, the light emitted from each of the lasers has the in-plane anisotropy in terms of coherence Note that the detailed configuration of this light source unit 11 will be described later (FIG. 2).

Figure 3:
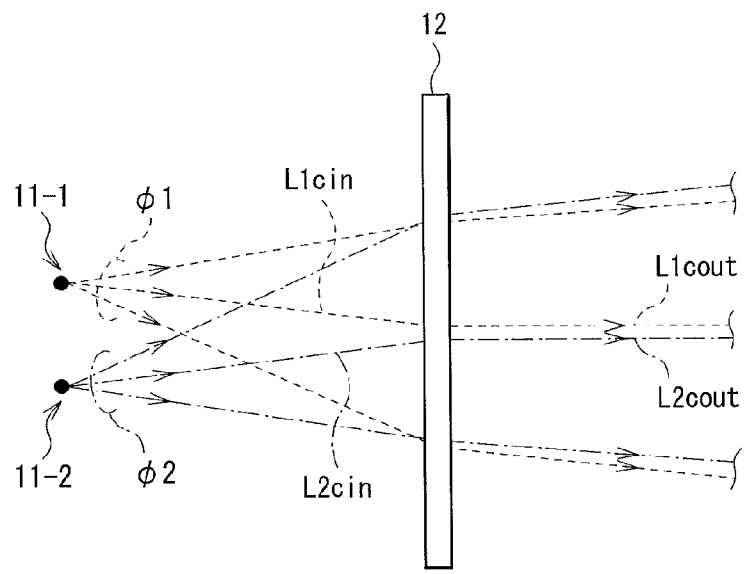
FIG. 3 is a schematic diagram for illustrating the function of the optical-path conversion member shown in FIG. 2.
Figure 4:
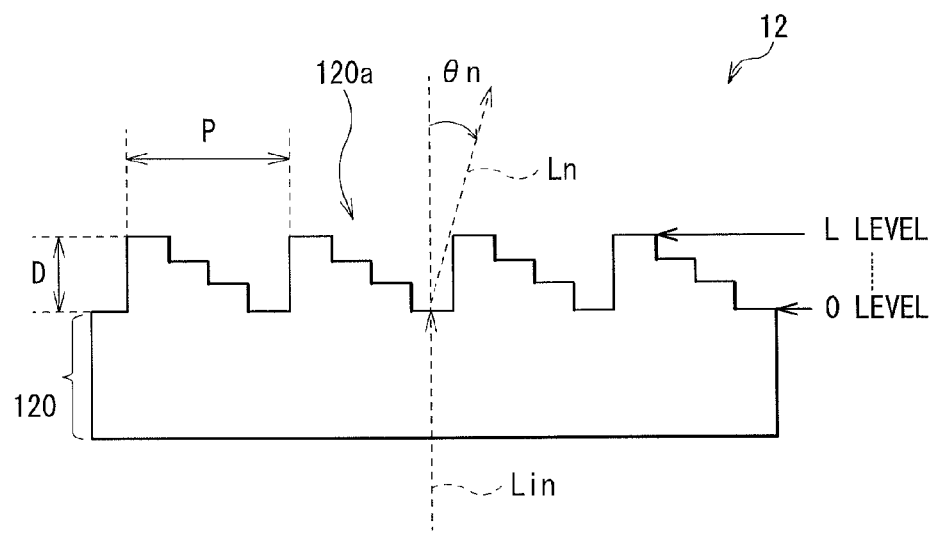
FIG. 4 is a cross-sectional diagram showing the detailed configuration of the optical-path conversion member shown in FIG. 2.

The optical-path conversion member 12 is an optical member that performs optical-path conversion to incoming light in such a manner that, compared with an angle formed by center rays in the incoming light coming from each of the red, green, and blue lasers 11R, 11G, and 11B, an angle formed by center rays in outgoing light becomes much smaller. To be specific, especially herein, the optical-path conversion (color synthesis, optical-path synthesis) is so performed that the angle formed by the center rays in the outgoing light from the optical-path conversion member 12 becomes substantially 0 (zero) degree (desirably becomes 0 degree). This thus corrects any deviation of the outgoing light from the optical axis caused by a positional deviation of emitting points of the respective lasers in the light source unit 11, thereby being able to direct the outgoing light in the normal state into the fly-eye lens 15 that will be described later. Note that the detailed configuration of this optical-path conversion member 12 will be described later (FIGS. 2 to 4).

Figure 7:
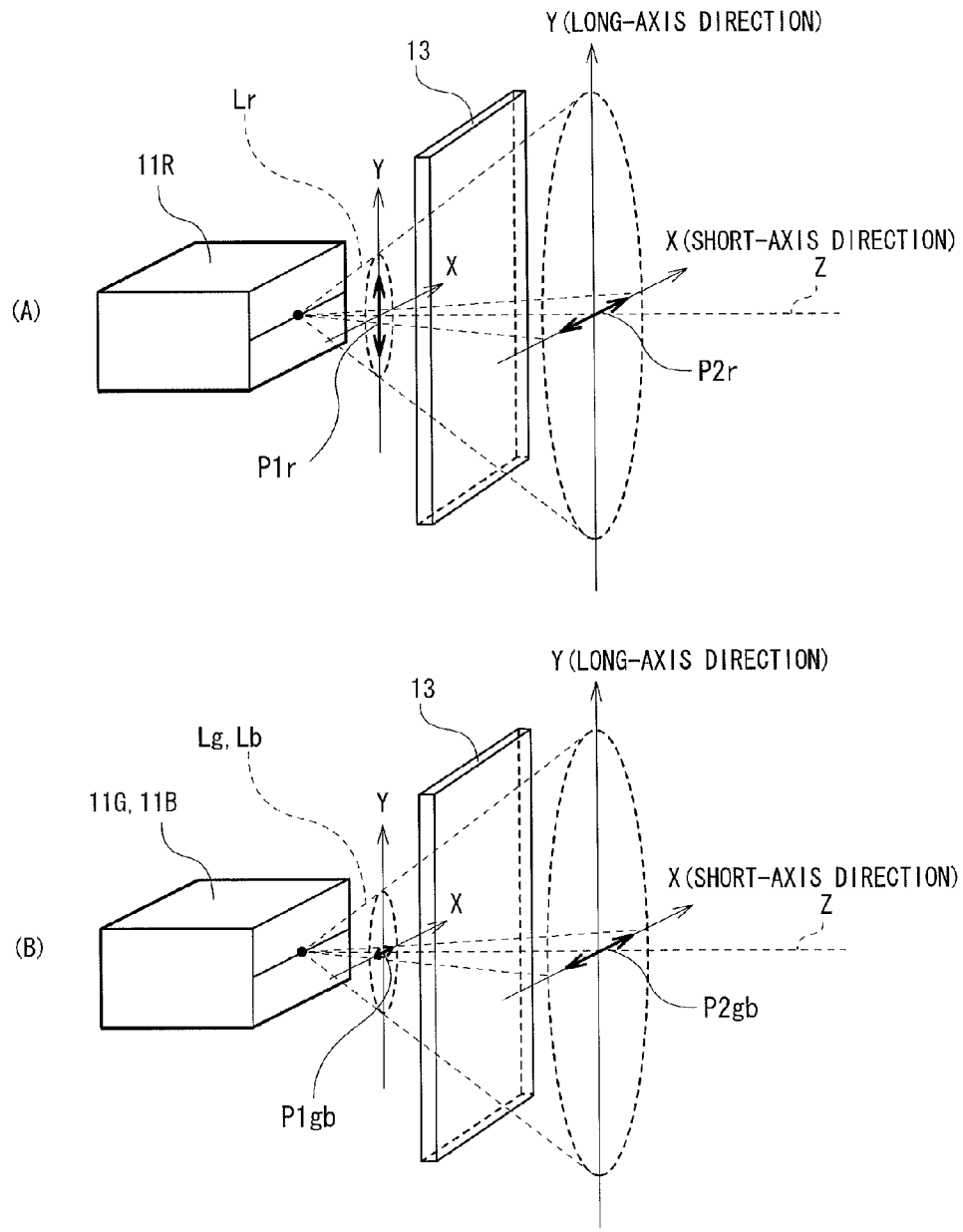
FIG. 7 is a schematic perspective diagram for illustrating the function of a retardation film shown in FIG. 1.

The retardation film 13 is, when the outgoing light from the red, green, and blue lasers 11R, 11G, and 11B is directed into two polarizing directions, for changing these two polarizing directions to make these polarizing directions close to each other. To be specific, especially herein, by selectively changing these two polarizing directions, the polarizing directions are made to coincide with each other after the light passes through the retardation film 13. Note that the detailed function of this retardation film 13 will be described later (FIG. 7).

The collimator lens 14 is a lens for collimating the light coming from the retardation film 13 to have parallelized light.

The fly-eye lens 15 includes a plurality of lenses two-dimensionally arranged on a substrate, and spatially splits, before emission, incoming luminous fluxes according to the arrangement of these lenses. With this, the light coming from this fly-eye lens 17 is made uniform (the luminance distribution in the plane is made uniform), and is emitted as illumination light.

(Display Optical System)

The display optical system described above is configured to include a light modulation device 21, a polarization beam splitter (PBS) 22, and a projection lens 23 (a projection optical system).

The light modulation device 21 emits video light by the illumination light from the illumination unit 1 being modulated and reflected at the same time based on an image signal provided by a display control section that is not shown. At this time, in the light modulation device 21, the reflection is performed so as to have different polarized light (for example, s-polarized light or p-polarized light) between at the time of light incidence and light emission. Such a light modulation device 21 is configured by a reflective liquid crystal device such as LCOS (Liquid Crystal On Silicon).

The polarization beam splitter 22 is an optical member that selectively allows specific polarized light (for example, s-polarized light) to pass therethrough, and selectively allows the remaining polarized light (for example, p-polarized light) to be reflected. With this, the illumination light (for example, s-polarized light) coming from the illumination unit 1 is selectively reflected, and then is directed into the light modulation device 21, and the video light (for example, p-polarized light) emitted from this light modulation device 21 is selectively passed through the polarization beam splitter 22, and then is directed into the projection lens 23.

The projection lens 23 is a lens for projecting (enlarging and projecting), onto the screen 30, the illumination light (video light) modulated by the light modulation device 21, and is configured herein by three lenses 23a, 23b, and 23c.

[Detailed Configurations of Light Source Unit 11 and Optical-Path Conversion Member 12]

Next, by referring to FIGS. 2 to 4, described are the detailed configurations of the light source unit 11 and the optical-path conversion member 12 described above.

(Light Source Unit 11)

FIG. 2 is a diagram schematically showing the detailed cross-sectional configuration of the light source unit 11 together with the optical-path conversion member 12. The light source unit 11 is in the package configuration to accommodate the above-described three types of light sources (the red laser 11R, the green laser 11G, and the blue laser 11B).

To be specific, in this light source unit 11, a flat-shaped support member (base) 110 is provided thereon with a heat radiation member (heatsink, stem) 112, and on this heat radiation member 112, the red, green, and blue lasers 11R, 11G, and 11B are mounted. In the support member 110, a plurality of connection terminals 111 pass therethrough and protrude therefrom to the outside. These terminals 111 are individually connected in the vicinity of the lasers by a bonding wire 113. The support member 110 is provided thereon with a sealing member (package member, package) so that the heat radiation member 112 and the lasers are covered entirely thereby. Specifically, the red, green, and blue lasers 11R, 11G, and 11B are accommodated in one (single) package (the sealing member 114). With a plurality types of light sources integrated in one package as such, the illumination unit 1 is allowed to be reduced in size in its entirety. Herein, the light from each of the lasers (red laser light Lr, green laser light Lg, and blue laser light Lb) is emitted to the outside via an emission region (a window section) 114a provided to the sealing member 114.

Herein, in the light source unit 11, the red, green, and blue lasers 11R, 11G, and 11B are arranged in parallel in this order with a predetermined distance therebetween. In this embodiment, these lasers are arranged in parallel with respect to the optical axis Z, and as shown in the drawing, the optical path of the light from each of the lasers is parallel with respect to the optical axis Z. Moreover, as an example herein, the green laser 11G is disposed on the optical path Z, and as shown in the drawing, the red and blue lasers 11R and 11B are disposed around this green laser 11G with distances Δr and Δb respectively therefrom.

Moreover, although the details will be given later, in the light source unit 11, the red, green, and blue lasers 11R, 11G, and 11B are so disposed that, in the light coming therefrom, the long-axis direction of the above-described FFP is the same.

(Optical-Path Conversion Member 12)

As shown in FIG. 3, the optical-path conversion member 12 performs optical-path conversion in such a manner that, compared with an angle formed by center rays in the light at the time of incidence from the lasers in the light source unit 11 (the red laser light Lr, the green laser light Lg, and the blue laser light Lb), an angle formed by center rays in outgoing light becomes much smaller. Herein, especially, the optical-path conversion (color synthesis, optical-path synthesis) is so performed that an angle formed by the center rays in the outgoing light from the optical-path conversion member 12 (the red laser light Lr, the green laser light Lg, and the blue laser light Lb) becomes substantially 0 degree (desirably becomes 0 degree).

Herein, by referring to FIG. 3, the function of this optical-path conversion member 12 (the principle of optical-path conversion) is described in detail. Note that, for simplicity of description, FIG. 3 exemplarily shows two types of light sources (light sources 11-1 and 11-2). The light source 11-1 emits a luminous flux φ1 being diverging light (the trail of rays in the luminous flux φ1 is indicated by broken lines), and the light source 11-2 emits a luminous flux φ2 being diverging light (the trail of rays in the luminous flux φ2 is indicated by alternate long and short dashed lines). Moreover, in the luminous flux φ1, the center ray in the light entering the optical-path conversion member 12 is denoted by L1cin, and the center ray in the light coming from the optical-path conversion member 12 is denoted by L1cout. Similarly, in the luminous flux φ2, the center ray in the light entering the optical-path conversion member 12 is denoted by L2cin, and the center ray in the light coming from the optical-path conversion member 12 is denoted by L2cout.

At this time, the optical-path conversion member 12 performs optical-path conversion in such a manner that, compared with an angle θin formed by the center rays L1cin and L2cin respectively coming from the light sources 11-1 and 11-2, an angle θout formed by the outgoing center rays L1cout and L2cout becomes much smaller. In other words, the optical-path conversion is so performed as to satisfy the conditional expression of θin>θout. Then, especially herein, the optical-path conversion is performed in such a manner that the angle θout formed by the center rays L1cout and L2cout coming from the optical-path conversion member 12 becomes approximately equal to 0° (desirably becomes θout=0°).

This optical-path conversion member 12 has the diffraction grating structure (the one-dimensional diffraction grating structure). To be specific, in this embodiment, this diffraction grating structure is formed by the step structure that will be described below in detail. When the optical-path conversion member 12 in use has this step structure, it is desirable to satisfy any of the conditional expressions defined by the following expressions (1) to (4). This is because, with the lasers arranged to satisfy such conditional expressions, it means that the angle formed by the center rays in light coming from the optical-path conversion member 12 becomes 0 degree (color synthesis, optical-path synthesis is performed). Note that, in these expressions, the blue laser light Lb is assumed to have the wavelength λb of about 435 to 460 nm, the green laser light Lg is assumed to have the wavelength λg of about 500 to 560 nm, and the red laser light Lr is assumed to have the wavelength λg of about 625 to 650 nm. Moreover, in the blue laser light Lb, the green laser light Lg, and the red laser light Lr (n-order diffracted light) emitted from the optical-path conversion member 12, the diffraction orders are respectively assumed to be nb, ng, and nr, and for the blue laser 11B, the green laser 11G, and the red laser 11R, the distances from the optical axis Z are respectively assumed to be Δb, Δg, and Δr.

[Expression 1]

$$|nb \cdot \lambda b / \Delta b| = |ng \cdot \lambda g / \Delta g| = |nr \cdot \lambda r / \Delta r| \quad (1)$$

when $\Delta b \neq 0$, $\Delta g \neq 0$, and $\Delta r \neq 0$ $$|ng \cdot \lambda g / \Delta g| = |nr \cdot \lambda r / \Delta r| \quad (2)$$

when $\Delta b = 0$, $\Delta g \neq 0$, and $\Delta r \neq 0$ $$|nb \cdot \lambda b / \Delta b| = |nr \cdot \lambda r / \Delta r| \quad (3)$$

when $\Delta b \neq 0$, $\Delta g = 0$, and $\Delta r \neq 0$ $$|nb \cdot \lambda b / \Delta b| = |ng \cdot \lambda g / \Delta g| \quad (4)$$

when $\Delta b \neq 0$, $\Delta g \neq 0$, and $\Delta r = 0$

FIG. 4 is a conceptual diagram showing the detailed cross-sectional configuration of the optical-path conversion member 12. The optical-path conversion member 12 has the diffraction grating structure, including a base section 120, and step-different planes 120a periodically formed on one plane (surface) side of this base section 120. In other words, the diffraction grating structure in this optical-path conversion member 12 is formed by the above-described step structure being the periodical step-different-plane structure. In this step structure, specifically as shown in the drawing, the step-different plane 120a is in level from 0 to L (3 levels herein), and the depth (step depth) in this step-different plane 120a (step-different-plane structure) is D, and the pitch of the step-different-plane structure (the unit diffraction structure) is P.

With the optical-path conversion member 12 in such a step structure, as shown in the drawing, when incoming light Lin has the wavelength of λ, the diffraction efficiency I(n, D) of the n-order diffracted light Ln, and the diffraction angle θn thereof are respectively expressed by the following expressions (5) and (6). Note that, in the expression (5), the number of step levels in the step-different plane 120a is L, the medium refractive index on the light-incident side (the optical-path conversion member 12) is n0, and the medium refractive index on the light-exit side is n1 (=1).

[Expression 2]

$$\begin{cases} I(n, D) = \dfrac{\sin^2\left\{\dfrac{\pi DL}{\lambda(L-1)}(n_0 - n_1)\right\}\sin^2\left(\dfrac{n\pi}{L}\right)}{L^2\sin^2\left\{\dfrac{\pi D}{\lambda(L-1)}(n_0 - n_1) - \dfrac{n\pi}{L}\right\}\left(\dfrac{n\pi}{L}\right)^2} & (5) \\ \sin(\theta n) = n\lambda/P & (6) \end{cases}$$

Herein, with the optical-path conversion member 12 in this embodiment, the depth (step depth) D in the step structure is preferably so set that the diffraction efficiency I(n, D) of the n-order diffracted light Ln defined by the expression (5) above is 0.7 or higher (I(n, D)≥0.7). This is due to the following reasons. That is, first of all, in order to ensure the optical efficiency (geometrical optics) of about 70% (0.7), considering the radiation angle of the lasers (the vertical direction: about 20 to 45°), NA≥0.26 is necessary. Moreover, as the efficiency index of intensity in the micro-projector, exemplified is a numeric value of 10 (lumen/W). Herein, the efficiency of intensity is calculated by a predetermined definition expression using the optical efficiency, the electric efficiency, the emission efficiency of the light source, and the luminosity factor. Herein, the optical efficiency is defined by the geometric-optical efficiency (about 70%, dependent on NA), the transmittance of components (about 80%), and the efficiency of polarized light (about 90%). Moreover, the electric efficiency is defined by the aperture ratio and the reflectivity (about 60%) of the light modulation device. The emission efficiency of the light source is (specifically, although varies depending on the wavelength) about 20 to 25 (W/W). As the luminosity factor, a normal invariable value is used.

When the above-described conditional expression of I(n, D)≥0.7 is satisfied, the combination of the diffraction orders nb, ng, and nr in the blue, green, and red laser light Lb, Lg, and Lr (n-order diffracted light) with the number of step levels L in the step structure is exemplified as those expressed by the following expressions (7) to (18).

$$L=3, (nb=+1, ng=+1, nr=+1) \quad (7)$$

$$L=3, (nb=-1, ng=-1, nr=-1) \quad (8)$$

$$L=3, (nb=-1, ng=0, nr=+1) \quad (9)$$

$$L=3, (nb=+1, ng=-1, nr=+1) \quad (10)$$

$$L=3, (nb=-1, ng=+1, nr=-1) \quad (11)$$

$$L=3, (nb=+1, ng=0, nr=-1) \quad (12)$$

$$L=4, (nb=+1, ng=0, nr=-1) \quad (13)$$

$$L=5, (nb=+1, ng=0, nr=-1) \quad (14)$$

$$L=5, (nb=+1, ng=+1, nr=+1) \quad (15)$$

$$L=6, (nb=-2, ng=+2, nr=-1) \quad (16)$$

$$L=6, (nb=0, ng=-1, nr=-2) \quad (17)$$

$$L=7, (nb=+1, ng=-1, nr=-2) \quad (18)$$

[Function and Effect of Display 3]

(1. Display Operation)

In this display 3, first of all in the illumination unit 1, optical-path conversion is performed in a predetermined manner in the optical-path conversion member 12 with respect to the light (laser light) emitted respectively from the red, green, and blue lasers 11R, 11G, and 11B in the light source unit 11. The light subjected to the optical-path conversion as such is collimated by the collimator lens 14 after passing through the retardation film 13, and becomes the parallelized light and enters the fly-eye lens 15. Thereafter, this incident light is made uniform (the luminance distribution in the plane is made uniform) by the fly-eye lens 15, and is emitted as illumination light.

Next, this illumination light is selectively reflected by the polarization beam splitter 22, and then enters the light modulation device 21. In the light modulation device 21, this incident light is emitted as video light as being modulated and reflected at the same time based on an image signal. Herein, in this light modulation device 21, since the polarized light at the time of light incidence and light emission is different, the video light emitted from the light modulation device 21 selectively passes through the polarization beam splitter 22, and enters the projection lens 23. Thereafter, this incident light (video light) is projected (enlarged and projected) onto the screen 30 by the projection lens 23.

At this time, in the light source unit 11, the red, green, and blue lasers 11R, 11G, and 11B each sequentially generate light (perform pulse emission) in a time division manner, and respectively emit laser light (the red, green, and blue laser light Lr, Lg, and Lb). Thereafter, in the light modulation device 21, based on the image signal of each color component (red, green, or blue component), the laser light of the corresponding color is sequentially modulated in a time division manner. As a result, color video display based on the image signals is performed on the display 3.

(2. Function of Characteristics Part)

Next, the function of the characteristics part of the present invention (the function of the illumination unit 1) is described in detail in comparison with comparative examples (comparative examples 1 and 2).

Comparative Example 1

Figure 5:
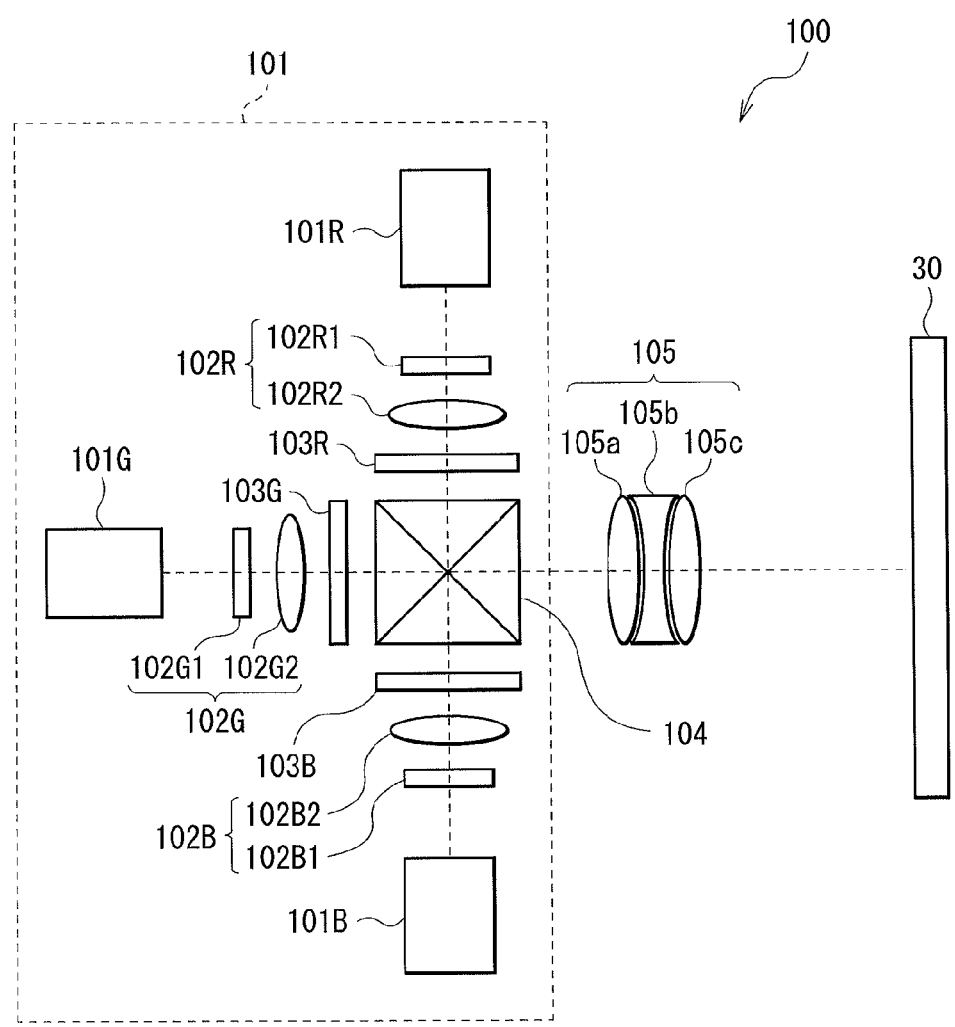
FIG. 5 is a diagram showing the entire configuration of a display according to a comparative example 1.

FIG. 5 is a diagram showing the entire configuration of a display (a display 100) according to a comparative example 1. Similarly to the display 3 in the embodiment, the display 100 in this comparative example 1 is a projection-type display that projects video light onto the screen 30, and includes an illumination unit 101, and a projection lens 105 as a display optical system (a projection optical system).

The illumination unit 101 is provided with a red laser 101R, a green laser 101G, and a blue laser 101B. The illumination unit 101 is also provided with, on an optical path for red laser light, an uniformalizing optical system 102R (a hologram 102R1, and a field lens 102R2), and a light modulation device (a transmissive liquid crystal device) 103R. Similarly, on an optical path for green laser light, an uniformalizing optical system 102G (a hologram 102G1, and a field lens 102G2), and a light modulation device (a transmissive liquid crystal device) 103G are provided. Moreover, on an optical path for blue laser light, an uniformalizing optical system 102B (a hologram 102B1, and a field lens 102B2), and a light modulation device (a transmissive liquid crystal device) 103B are provided. The illumination unit 101 is also provided with a dichroic prism 104 as color synthesis means (optical-path synthesis means). On the other hand, the projection lens 105 is configured herein by three lenses 105a, 105b, and 105c.

With the display 100 in this comparative example 1, in the illumination unit 101, the light emitted from the red laser 101R (laser light) is made uniform by the uniformalizing optical system 102R, and then is modulated by the light modulation device 103R based on an image signal and passes therethrough at the same time, thereby being emitted as video light. Similarly, the light emitted from the green laser 101G is made uniform by the uniformalizing optical system 102G, and is modulated by the light modulation device 103G based on an image signal and passes therethrough, thereby being emitted as video light. Moreover, the light emitted from the blue laser 101B is made uniform by the uniformalizing optical system 102B, and is modulated by the light modulation device 103B based on an image signal and passes therethrough, thereby being emitted as video light. The video light of various colors emitted respectively from the light modulation devices 103R, 103G, and 103B as such is subjected to color synthesis (optical-path synthesis) in the dichroic prism 104, thereby entering the projection lens 105 as video light corresponding to color video. Thereafter, by this color video light being projected (enlarged and projected) onto the screen 30 by the projection lens 105, the color video display based on the image signals is performed on the display 100.

Herein, with this illumination unit 101, when a packaged semiconductor laser is used as the red, green, and blue lasers 101R, 101G, and 101B, for example, due to the following reasons, a need arises to construct the large-scale (large-sized) optical system (optical members). That is, first of all in this case, there needs to use a semiconductor laser package with the outer dimensions of about φ 5.6 mm, and the entire length of about 3.5 mm (not including a lead section), and high-NA field lenses 102R2, 102G2, and 102B2 each in the large outside-diameter shape. In addition, in the illumination unit 101, the above-described dichroic prism (cross prism) 104 is also disposed. The illumination unit 101 provided with such components is larger in size as an illumination unit for use in a micro-projector, and causes a difficulty in realizing a small-sized projector.

Comparative Example 2

Figure 6:
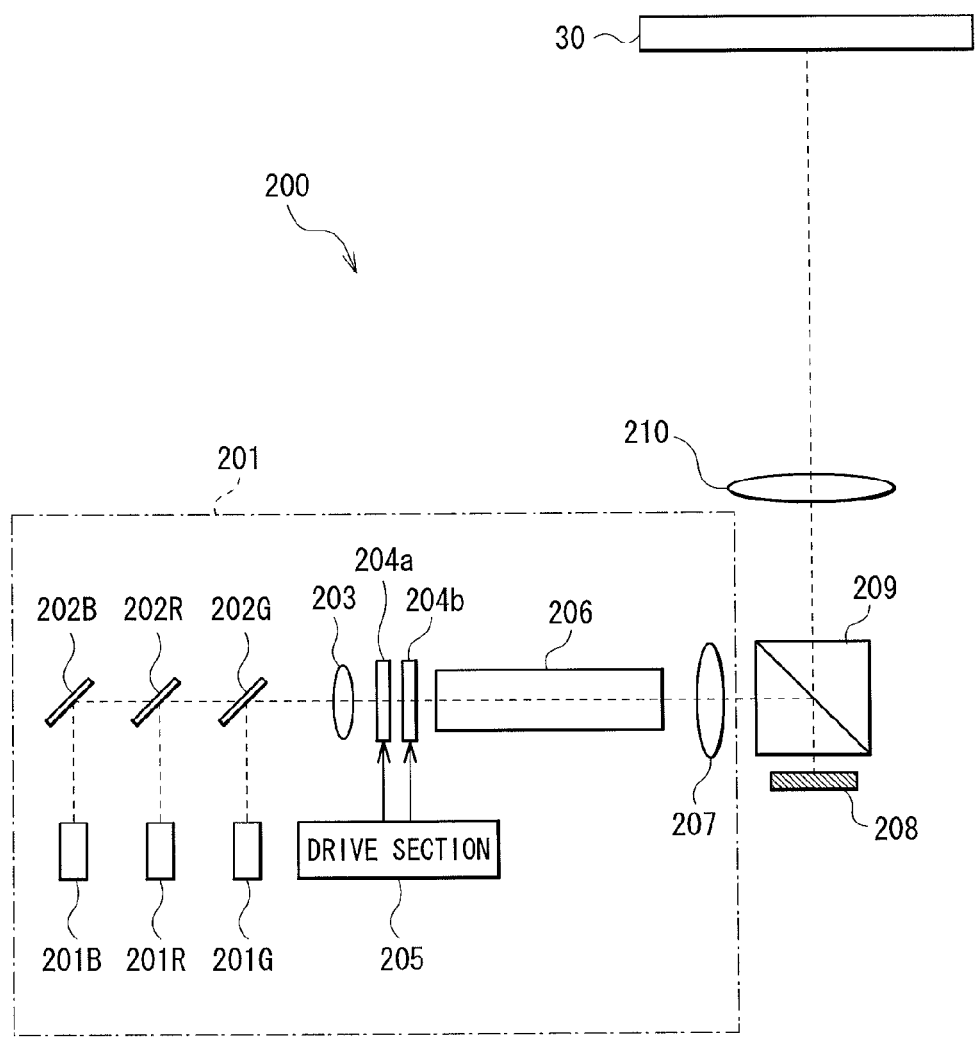
FIG. 6 is a diagram showing the entire configuration of a display according to a comparative example 2.

FIG. 6 is a diagram showing the entire configuration of a display (a display 200) according to a comparative example 2. Similarly to the display 3 in the embodiment, the display 200 in this comparative example 2 is also a projection-type display that projects video light onto the screen 30. This display 200 is provided with an illumination unit 201, a light modulation device (a reflective liquid crystal device) 208 as a display optical system, a polarization beam splitter 209, and a projection lens 210 (a projection optical system).

The illumination unit 201 is provided with a red laser 201R, a green laser 201G, and a blue laser 201B. This illumination unit 201 is also provided with a mirror 202B, dichroic mirrors 202R and 202G, a light-gathering lens 203, diffusion devices 204a and 204b, a drive section 205, a rod integrator 206, and a lens 207.

With the display 200 in this comparative example 2, in the illumination unit 201, light (laser light) emitted from the blue laser 201B is reflected by the mirror 202B, selectively passes through the dichroic mirrors 202R and 202G, and then enters the light-gathering lens 203. On the one hand, light emitted from the red laser 201R is selectively reflected by the dichroic mirror 202R, selectively passes through the dichroic mirror 202G, and then enters the light-gathering lens 203. On the other hand, the light emitted from the green laser 201G is selectively reflected by the dichroic mirror 202G, and then enters the light-gathering lens 203. In this manner, the light emitted from the lasers is subjected to color synthesis (optical-path synthesis) by the mirror 202B, and the dichroic mirrors 202R, and 202G, and enters the light-gathering lens 203. The incident light subjected to the color synthesis as such is gathered by the light-gathering lens 203 onto the incident end surface of the rod integrator 206. At this time, when the gathered light passes through the diffusion devices 204a and 204b, this gathered light is diffused according to the magnitude of a voltage applied from the drive section 205 to these diffusion devices 204a and 204b. Thereafter, the diffused light entered the rod integrator 206 is subjected to multiple reflection inside thereof so that the almost-uniform light quantity distribution is formed on the emission end surface of the rod integrator 206. The light made uniform as such passes through the lens 207, and is emitted from the illumination unit 201 as illumination light.

Next, this illumination light is selectively reflected by the polarization beam splitter 209, and enters the light modulation device 208. In the light modulation device 208, this incident light is emitted as video light as being modulated and reflected at the same time based on an image signal. Herein, in this light modulation device 208, since the polarized light at the time of light incidence and light emission is different, the video light emitted from the light modulation device 208 selectively passes through the polarization beam splitter 209, and then enters the projection lens 210. Thereafter, this incident light (video light) is projected (enlarged and projected) onto the screen 30 by the projection lens 210. At this time, the red, green, and blue lasers 201R, 201G, and 201B each sequentially generate light (perform pulse emission) in a time division manner, and respectively emit laser light of the corresponding color. Thereafter, in the light modulation device 208, based on the image signal of each color component (red, green, or blue component), the laser light of the corresponding color is sequentially modulated in a time division manner. As a result, color video display based on the image signals is performed on the display 200.

Herein, this illumination unit 201 is provided therein with the mirror 202B, and the dichroic mirrors 202R and 202G as the color synthesis means (optical-path synthesis means) as described above. The illumination unit 201 using such components is also increased in size as an illumination unit for use in a micro-projector, and thus causes a difficulty in realizing a small-sized projector.

As such, in order to use the light from the single-color lasers emitting light respectively in three primary colors for video display after optical-path synthesis (color synthesis) thereof, the illumination units 101 and 201 in the comparative examples 1 and 2 each need to construct a large-scale (large-sized) optical system (optical members). To be specific, the optical components including a high-NA lens, a dichroic prism, and a dichroic mirror, for example, need to be used. Therefore, these illumination units need a large space for physically arranging the optical members described above, and this is a cause of preventing the further size reduction (weight reduction) of the projector (projection-type display).

Embodiment

On the other hand, with the illumination unit 1 in the embodiment, the optical-path conversion is performed as below on the incident light (the red laser light Lr, the green laser light Lg, and the blue laser light Lb) with various different wavelengths entered the optical-path conversion member 12 from the three types of light sources (the red laser 11R, the green laser 11G, and the blue laser 11B) in the light source unit 11. That is, as shown in FIGS. 2 and 3, the optical-path conversion is performed in such a manner that, compared with an angle formed by the center rays in the incoming light, an angle formed by the center rays in the outgoing light becomes much smaller. Moreover, especially herein, the optical-path conversion (color synthesis, optical-path synthesis) is so performed that the angle formed by the center rays in the outgoing light (the red laser light Lr, the green laser light Lg, and the blue laser light Lb) from the optical-path conversion member 12 becomes substantially 0 degree (desirably becomes 0 degree).

Therefore, in the illumination unit 1, without using the large-scale optical system (optical members) as in the comparative examples 1 and 2 described above, the optical-path conversion is performed on the light emitted from a plurality types of light sources in such a manner that an angle formed by the center rays thereof becomes much smaller, and the light is then emitted.

Moreover, in the illumination unit 1, as shown in FIGS. 7(A) and (B), for example, the shape of the FFP of the laser light emitted from each of the red, green, and blue lasers 11R, 11G, and 11B is in the in-plane anisotropic shape (oval herein). In other words, the laser light emitted from each of the lasers has the in-plane anisotropy in terms of coherence. To be specific, the shape of the FFP in the red, green, and blue laser light Lr, Lg, and Lb is in the oval shape whose short axis is in the X direction in the XY plane, and whose long axis is in the Y direction. In other words, in such laser light, the red, green, and blue lasers 11R, 11G, and 11B are so arranged that the axial direction indicating high interference coincides with the X direction, and the axial direction indicating low interference coincides with the Y direction.

As such, by arranging the red, green, and blue lasers 11R, 11G, and 11B so as to have a matching of the long-axis direction of the FFP in the light coming from the lasers, the following advantages are produced in the illumination unit 1. That is, when an I-cut shape lens is used, for example, the optical loss is reduced. To be specific, when an I-cut shape lens is used, although the optical effective range is sacrificed in the I-cut portion, by making the long-axis direction of the radiation angle of the lasers coincide with the I-cut direction (direction of the wide effective diameter), the optical loss is reduced.

Moreover, in the embodiment, with the provision of the retardation film 13 that will be described in detail later in the illumination unit 1, even if the light coming from each of the lasers is polarized in two directions, the polarizing directions are made to be close to each other (made to coincide with each other herein).

To be specific, first of all, as shown in FIGS. 7(A) and (B), for example, for the red laser light Lr emitted from the red laser 11R, and for the green and blue laser light Lg and Lb emitted respectively from the green and blue lasers 11G and 11B, their polarizing directions P1r and P1gb are different from each other immediately after emission. Specifically, herein, as shown in FIG. 7(A), the polarizing direction P1r of the red laser light Lr is the long-axis direction (Y-axis direction) of the FFP shape. On the other hand, as shown in FIG. 7(B), the polarizing direction P1gb of the green and blue laser light Lg and Lb is the short-axis direction (X-axis direction) of the FFP shape. As such, when the R, G, and B vary in polarizing direction (herein, there are two polarizing directions) irrespective of the same FFP shape of the laser light, the following problem arises if no measures will be taken. That is, as the display 3 in the embodiment, for example, for the light modulation operation using a combination of the reflective light modulation device (the liquid crystal device) and the polarization beam splitter, the laser light of various colors needs to have the same polarizing direction, and thus the light modulation operation as such is not accordingly performed.

In consideration thereof, in the embodiment, when the light coming from the red, green, and blue lasers 11R, 11G, and 11B is directed in two polarizing directions as described above, the retardation film 13 changes these two polarizing directions to make these polarizing directions close to each other. To be specific, especially herein, by selectively changing these two polarizing directions, their polarizing directions are made to coincide with each other after the light passes through the retardation film 13. In other words, herein, as shown in FIG. 7(A), for example, with respect to the red laser light Lr whose polarizing direction P1r indicates the long-axis direction (Y-axis direction) of the FFP shape, the retardation film 13 is operated as a ½ wavelength plate for rotating the polarizing direction thereof by 90°. In this manner, the red laser light Lr after passing through this retardation film 13 has a polarizing direction P2r indicating the short-axis direction (X-axis direction) of the FFP shape. On the other hand, as shown in FIG. 7(B), for example, the retardation film 13 does not function against the green and blue laser light Lg and Lb (does not change the polarizing direction thereof) whose polarizing direction P1gb is originally indicating the short-axis direction (X-axis direction) of the FFP shape. As such, the green and blue laser light Lg and Lb after passing through this retardation film 13 has a polarizing direction P2gb indicating the short-axis direction (X-axis direction) of the FFP shape with no change.

In this manner, as to the red, green, and blue laser light Lr, Lg, and Lb after passing through the retardation film 13, their polarizing directions P2r and P2gb become the same (X-axis direction). This thus enables to perform the light modulation operation using a combination of the reflective light modulation device (the liquid crystal device) and the polarization beam splitter as described above.

As described above, in the embodiment, with the provision of the optical-path conversion member 12 performing the optical-path conversion to the light (the red laser light Lr, the green laser light Lg, and the blue laser light Lb) coming from the three types of light sources in the light source unit 11 (the red laser light 11R, the green laser light 11G, and the blue laser light 11B) in such a manner that, compared with the angle formed by the center rays in the light, the angle formed by the center rays in the outgoing light becomes much smaller, such optical-path conversion is performed without using a large-scale optical system (optical members). Therefore, when a plurality types of light sources emitting light with various different wavelengths are used, the size reduction (weight reduction) is achievable.

Moreover, since the step structure is used as the diffraction grating structure in the optical-path conversion member 12, the traveling direction (diffraction angle) and the efficiency (diffraction efficiency) of light beams are each selected as appropriate according to the circumstances with respect to the light with various different wavelengths. Furthermore, in comparison with the blazed structure according to a modification example 2 that will be described later, this step structure is easier to form the diffraction grating structure, and reduce the order of the diffracted light so that the distance between the lasers is easy to set to be smaller.

Note that in this embodiment, described is the case of using the three types of light sources emitting light with various different wavelengths in the light source unit 11. Alternatively, instead of using the three types of light sources, two types of light sources may be used, for example, and this is applicable also to other embodiments and modification examples that will be described later.

Second Embodiment

Next, described is a second embodiment of the present invention. Note here that any structure component same as that in the first embodiment is provided with the same reference numeral, and is not described again if appropriate.

[Entire Configuration of Display 3A]

Figure 8:
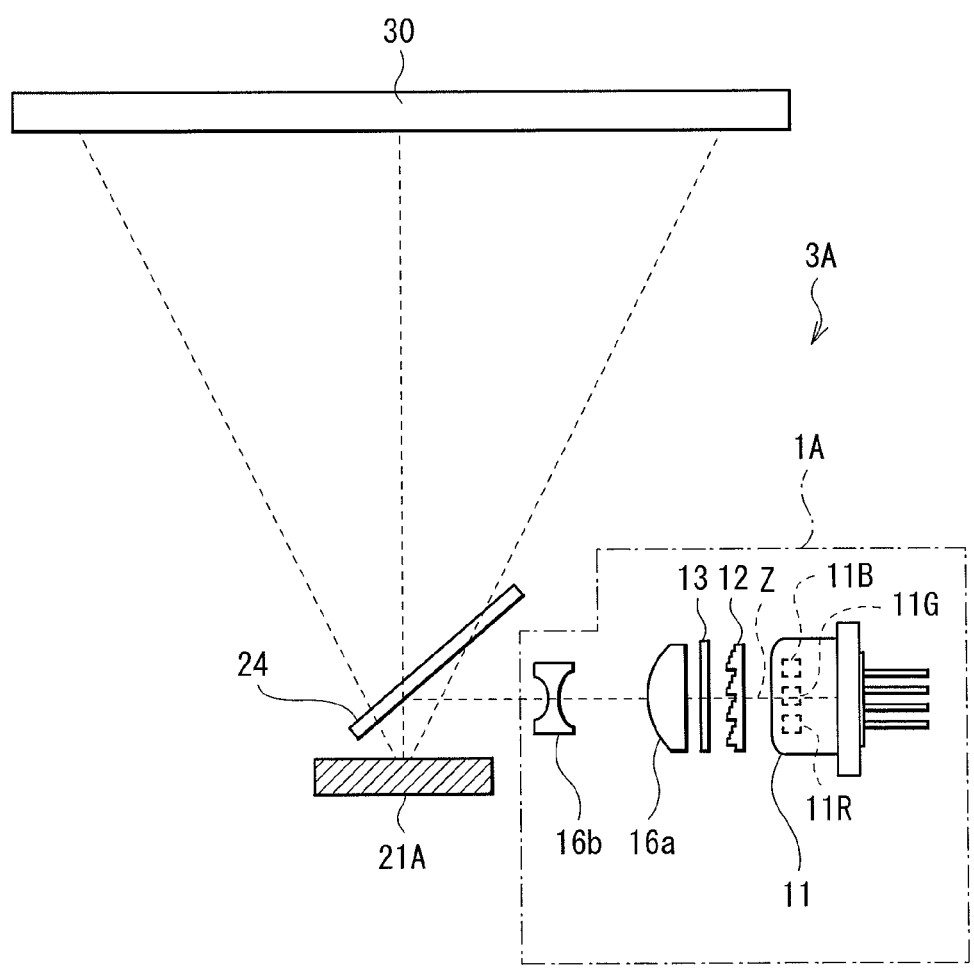
FIG. 8 is a diagram showing the entire configuration of a display according to a second embodiment.

FIG. 8 is a diagram showing the entire configuration of a display (a display 3A) according to the second embodiment. Similarly to the display 3 in the first embodiment, the display 3A in this embodiment is also a projection-type display that projects video light onto the screen 30. This display 3A is provided with an illumination unit 1A, and a light modulation device 21A and a splitter plate 24 as a display optical system.

(Illumination Unit 1A)

The illumination unit 1A includes the light source unit 11, the optical-path conversion member 12, the retardation film 13, and condenser lenses 16a and 16b. Specifically, this illumination unit 1A is provided with the condenser lenses 16a and 16b as alternatives to the collimator lens 14 and the fly-eye lens 15 in the illumination unit 1 in the first embodiment.

The condenser lenses 16a and 16b are each for performing NA conversion on light entering thereto after passing through the retardation film 13 (red laser light Lr, green laser light Lg, and blue laser light Lb).

(Display Optical System)

The light modulation device 21A is for emitting video light by modulating and reflecting at the same time illumination light from the illumination unit 1A, based on an image signal provided by a display control section that is not shown. At this time, in the light modulation device 21A, the light is so reflected that the polarized light (for example, s-polarized light or p-polarized light) at the time of light incidence and light emission is different. Moreover, this light modulation device 21A is so configured as to form video on the screen 30 by a mirror scanning operation. Such a light modulation device 21A is configured by a DMD (Digital Micromirror Device), for example.

The splitter plate 24 is an optical member for selectively passing therethrough specific polarized light (for example, s-polarized light), and for selectively reflecting the remaining polarized light (for example, p-polarized light). With this, the illumination light from the illumination unit 1A (for example, s-polarized light) enters the light modulation device 21A after being selectively reflected, and the video light emitted from this light modulation device 21A (for example, p-polarized light) is projected onto the screen 30 after being selectively passed therethrough.

[Function and Effect of Display 3A]

In the illumination unit 1A in this display 3A, similarly to the illumination unit 1, optical-path conversion is performed in a predetermined manner in the optical-path conversion device 12 to light (laser light) emitted from each of the red, green, and blue lasers 11R, 11G, and 11B in the light source unit 11. The light subjected to the optical-path conversion as such is then subjected to NA conversion by the condenser lenses 16a and 16b after passing through the retardation film 13, thereby being emitted as illumination light.

Thereafter, this illumination light is selectively reflected by the splitter plate 24, and enters the light modulation device 21A. In the light modulation device 21A, this incident light is modulated and reflected at the same time, based on an image signal, thereby being emitted as video light. Herein, in this light modulation device 21A, since the polarized light at the time of light incidence and light emission is different, the video light emitted from the light modulation device 21A selectively passes through the splitter plate 24. At this time, the light modulation device 21A also forms video on the screen 30 by the mirror scanning operation.

At this time, similarly to the display 3, in the light source unit 11, the laser light of various colors are sequentially emitted in a time division manner. Then, in the light modulation device 21A, based on the image signals of various color components, the laser light of the corresponding color is sequentially modulated in a time division manner. As a result, the color video display based on the image signals is performed on the display 3A.

In this manner, also in the display 3A in the embodiment, with the function similar to that in the first embodiment, the effect similar thereto is produced.

Modification Examples

Next, described are modification examples (modification examples 1 and 2) common to the first and second embodiments described above. Note that any structure component same as that in these embodiments is provided with the same reference numeral, and is not described again if appropriate.

Modification Example 1

Figure 9:
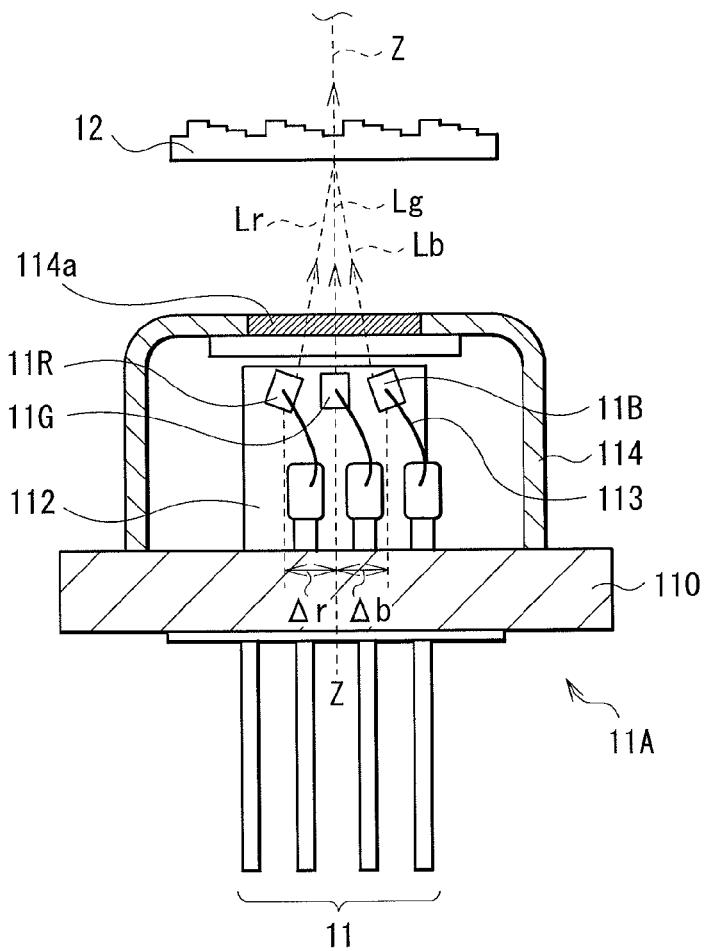
FIG. 9 is a schematic cross-sectional diagram showing the detailed configuration of a light source unit according to a modification example 1 together with an optical-path conversion member.

FIG. 9 is a diagram schematically showing the cross-sectional configuration of a light source unit (a light source unit 11A) according to a modification example 1 together with the optical-path conversion member 12. The light source unit 11A in this modification example is the light source unit in which at least one of the various-color lasers being a light source is so disposed as to tilt against the optical axis Z in the light source unit 11 in the first embodiment, and the remaining configuration is the same.

To be specific, in this light source unit 11A, similarly to the light source unit 11, the red, green, and blue lasers 11R, 11G, and 11B are arranged in parallel in this order with a predetermined distance therebetween. Specifically, as an example herein, the green laser 11G is disposed on the optical axis Z, and around this green laser 11G, the red and blue lasers 11R and 11B are disposed with distances of Δr and Δb respectively therefrom.

Note that, in the light source unit 11A, as shown in the drawing, the green laser 11G is disposed to be parallel to the optical axis Z, and the red and blue lasers 11R and 11B are each disposed to be tilted against the optical axis Z. Accordingly, the optical path for the green laser light Lg is parallel to the optical axis Z, but the red and blue laser light Lr and Lb enters the optical-path conversion member 12 in the direction along which their optical paths are tilted against the optical axis Z. Note that the tilting angle against the optical axis Z at this time is desirably set to be substantially equal to the diffraction angle θn of the diffracted light in the optical-path conversion member 12.

Herein, as the light source unit 11 shown in FIG. 2, for example, when the red, green, and blue lasers 11R, 11G, and 11B are each disposed to be parallel to the optical axis Z, this causes an intensity-peak displacement of the laser light after the optical-path conversion (optical-path synthesis) by the optical-path conversion member 12. To be specific, by the optical-path conversion by this optical-path conversion member 12, the optical paths for the laser light are indeed made to be the same, but the intensity peak in the radiation angle distribution shows a displacement by the diffraction angle θn with respect to the optical axis Z. In consideration thereof, like the light source unit 11A in this modification example, one or more of the various-color lasers being a light source is so disposed as to be tilted against the optical axis Z, thereby being able to align the intensity peak of the laser light subjected to the optical-path conversion (optical-path synthesis) along the direction of the optical axis Z.

Also in this modification example, the red and blue lasers 11R and 11B are in the offset arrangement to be closer to the position of emission point for the green laser 11G, thereby being able to set large the pitch P of the diffraction grating structure in the optical-path conversion member 12. This thus makes easy to manufacture this optical-path conversion member 12. This is due to the following reasons. That is, first of all, generally, in order to increase the emission power of each of the lasers, there needs to increase the chip size. However, with a larger chip size, the space between the emission points is increased, and this causes an increase of the diffraction power needed to perform the optical-path synthesis by the optical-path conversion member 12. If this is the case, since the diffraction grating structure is microstructured, the manufacturing difficulty is increased in degree, thereby leading to a higher cost. In consideration thereof, by making small the space between the emission points between the light sources (the lasers) without increasing the chip size as described above, the problem described above is solved.

Modification Example 2

Figure 10:
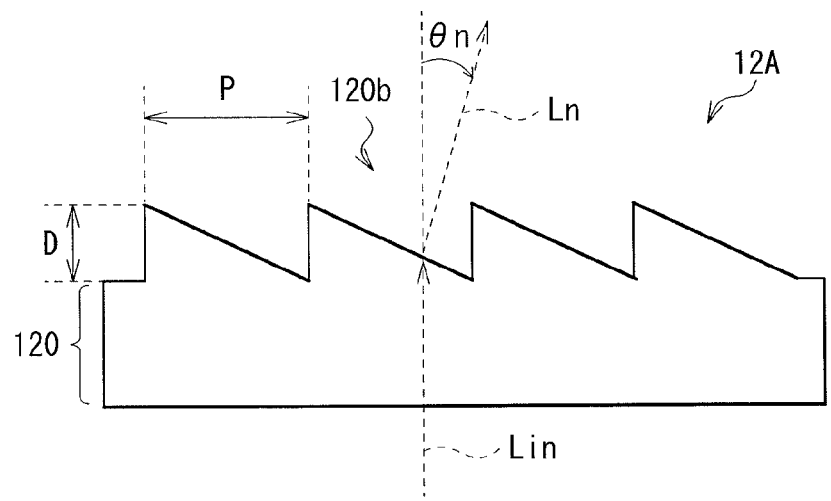
FIG. 10 is a cross-sectional diagram showing the detailed configuration of an optical-path conversion member according to a modification example 2.
Figure 13:
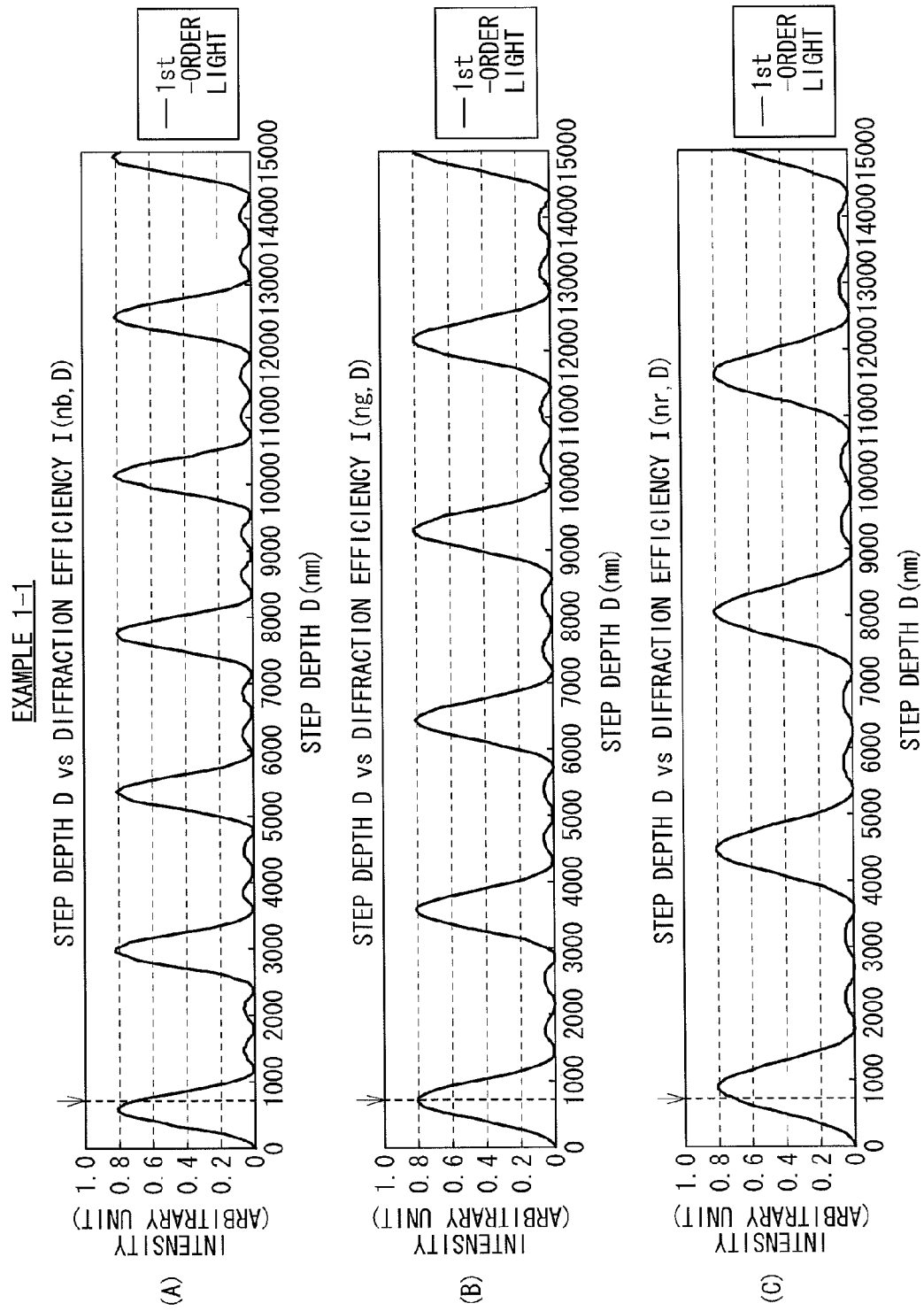
FIG. 13 is a diagram showing the diffraction efficiency characteristics of the optical-path conversion member according to the example 1-1.
Figure 14:
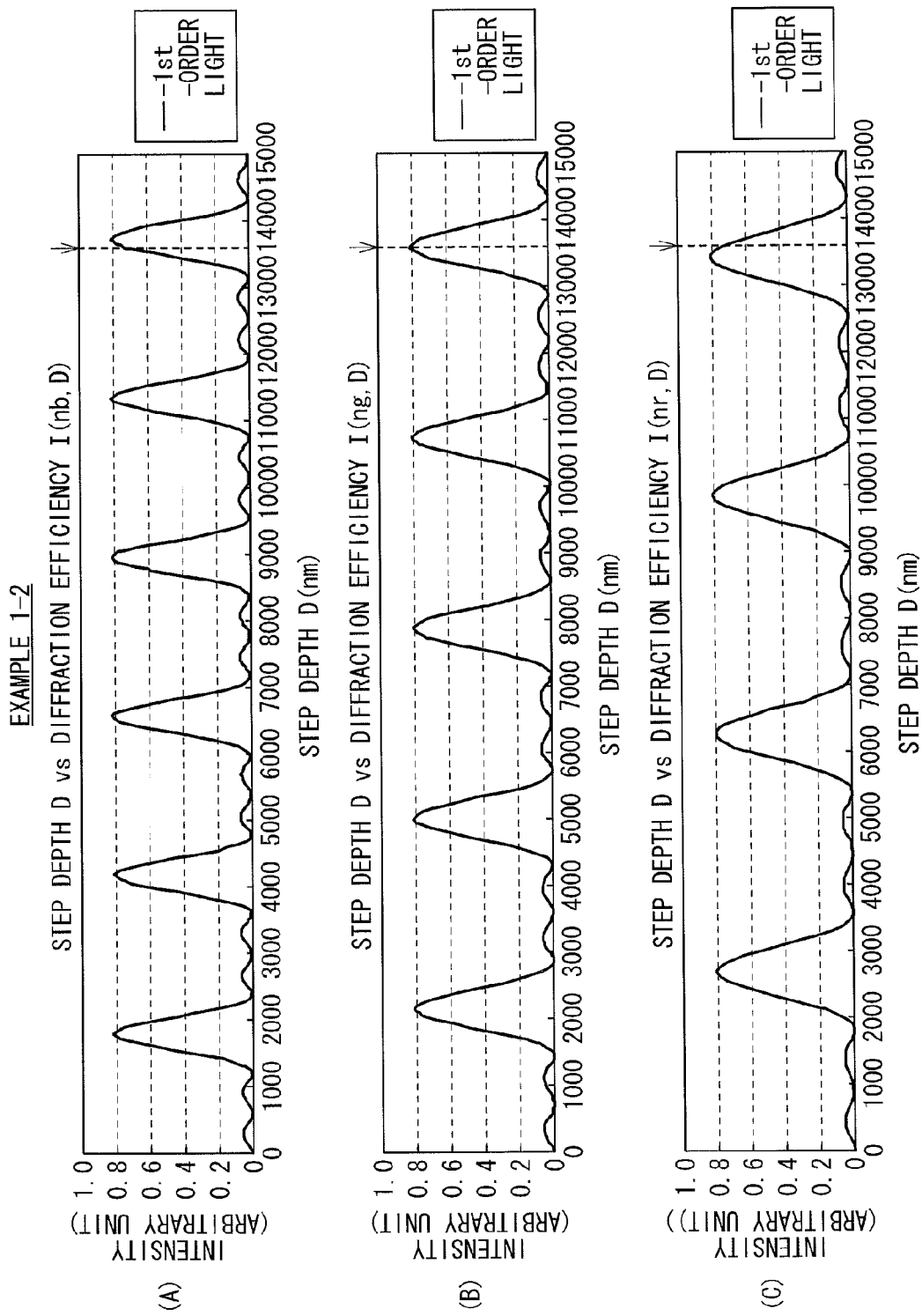
FIG. 14 is a diagram showing the diffraction efficiency characteristics of the optical-path conversion member according to the example 1-2.
Figure 15:
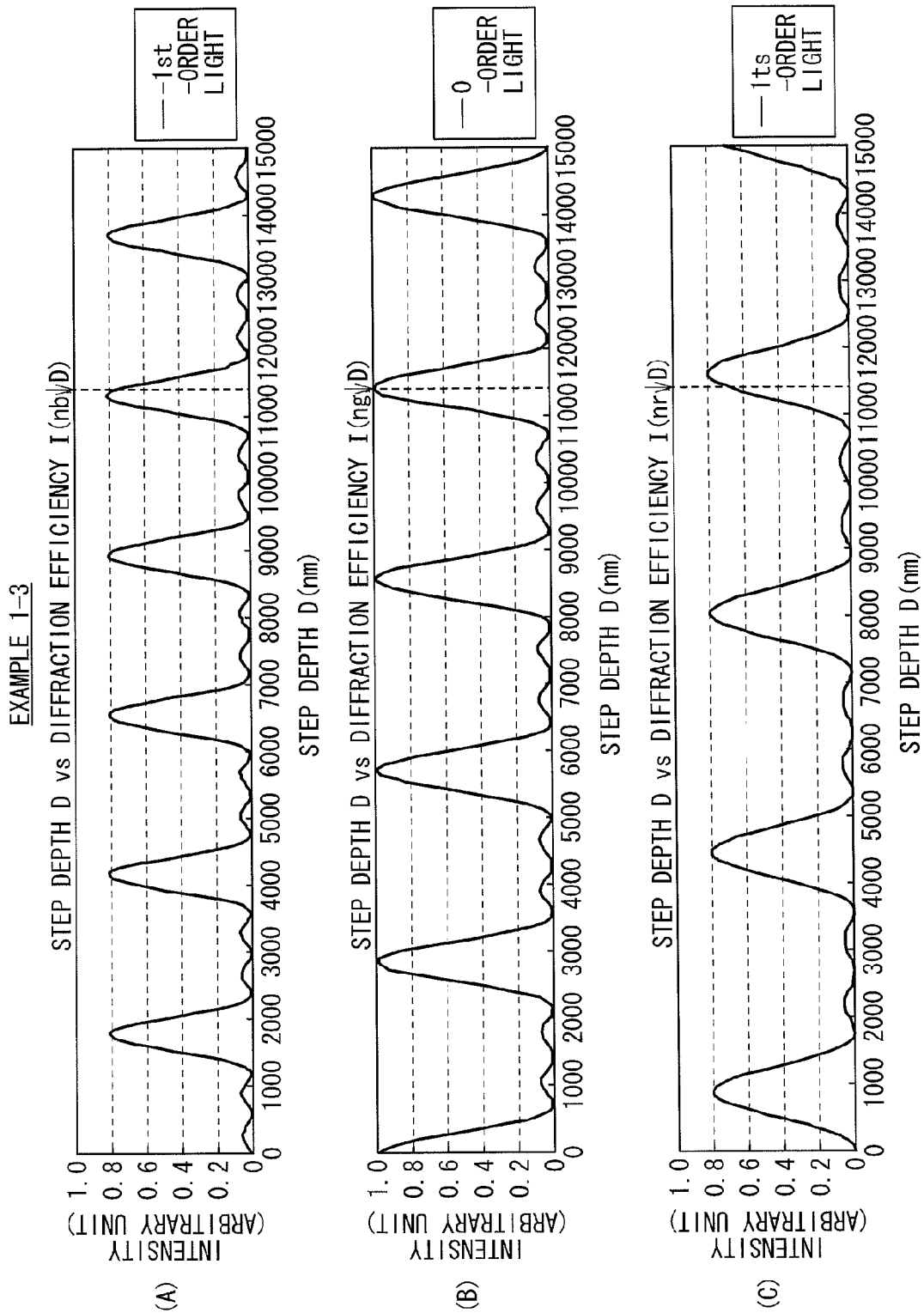
FIG. 15 is a diagram showing the diffraction efficiency characteristics of the optical-path conversion member according to the example 1-3.
Figure 16:
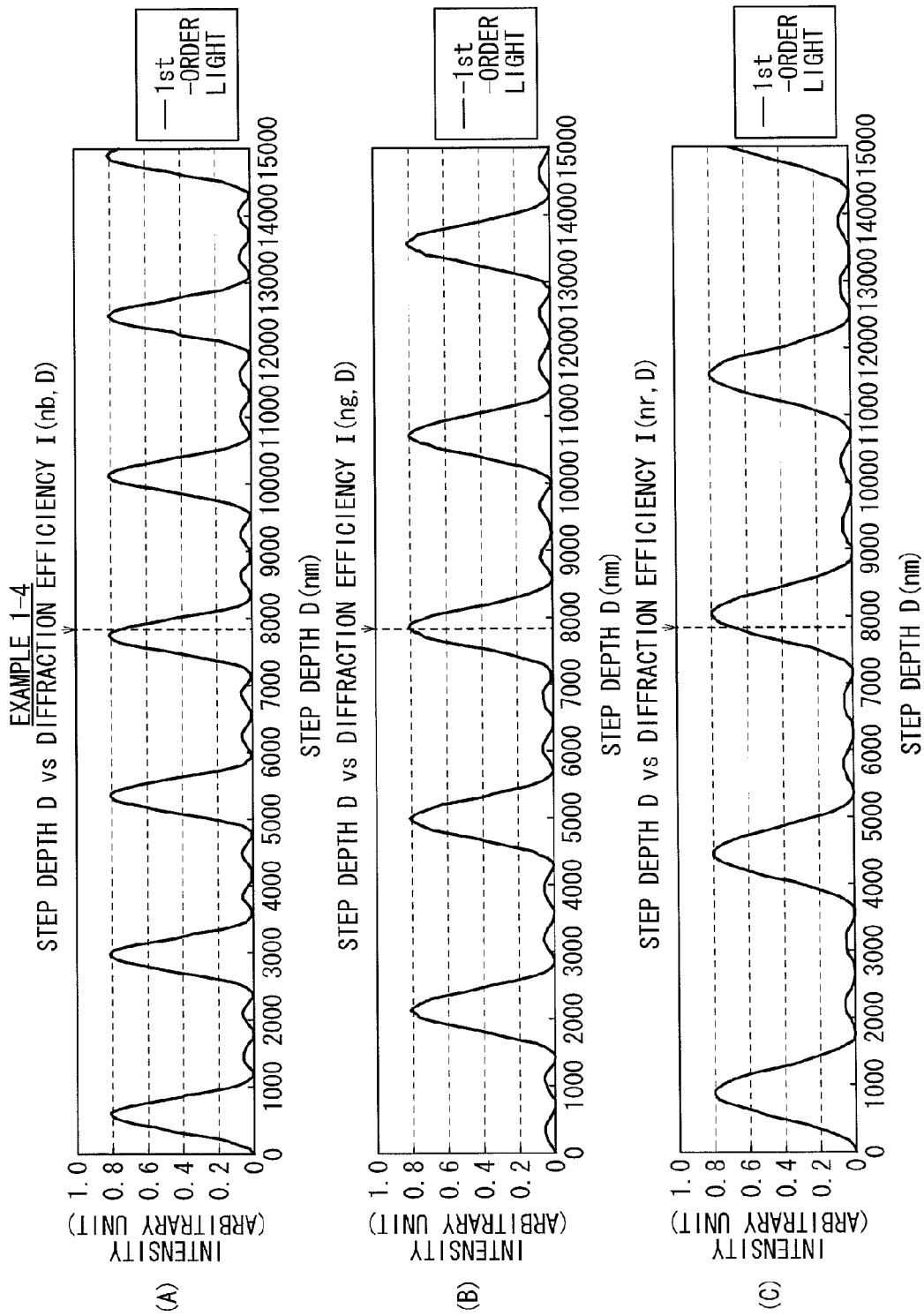
FIG. 16 is a diagram showing the diffraction efficiency characteristics of the optical-path conversion member according to the example 1-4.
Figure 17:
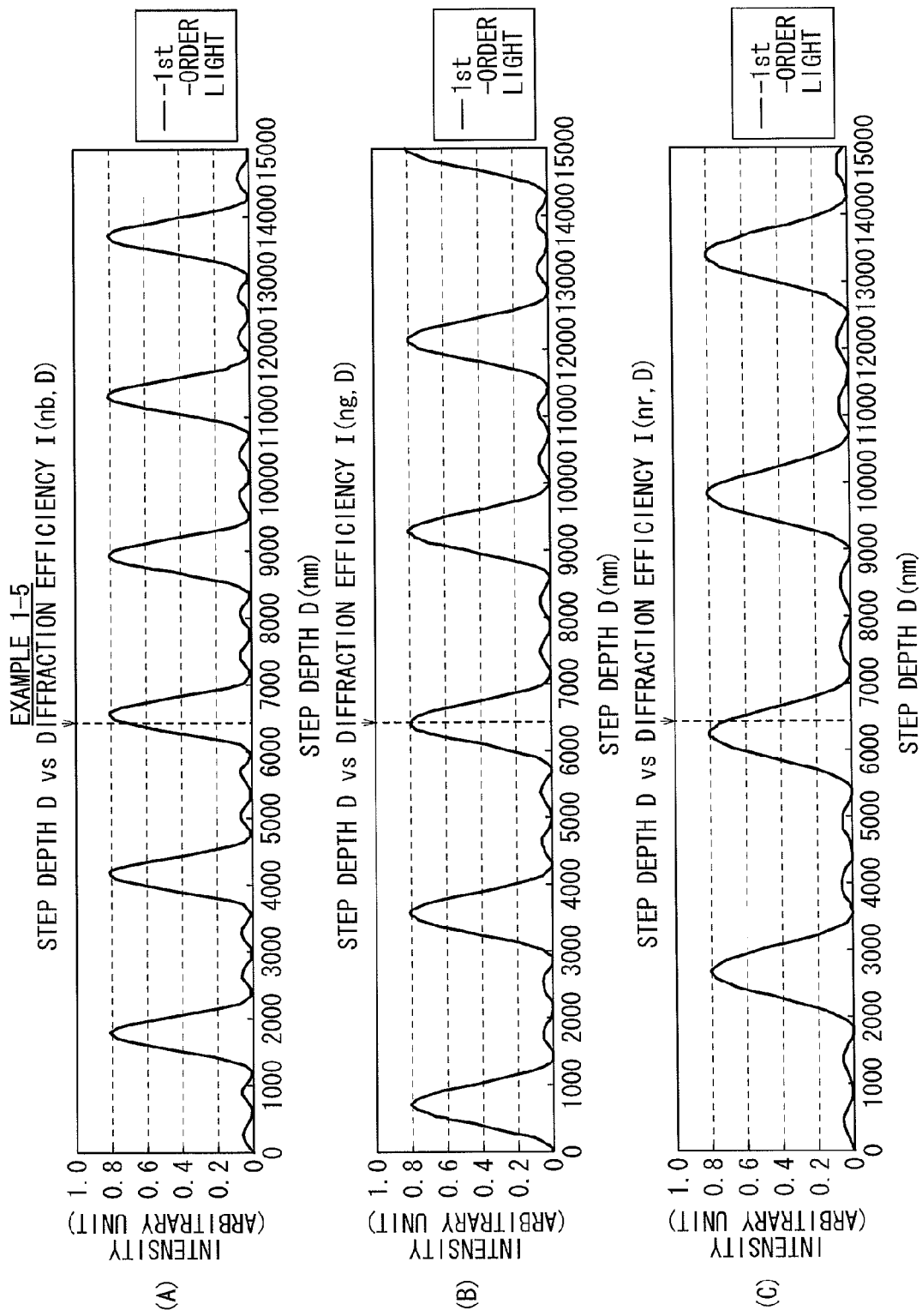
FIG. 17 is a diagram showing the diffraction efficiency characteristics of the optical-path conversion member according to the example 1-5.
Figure 18:
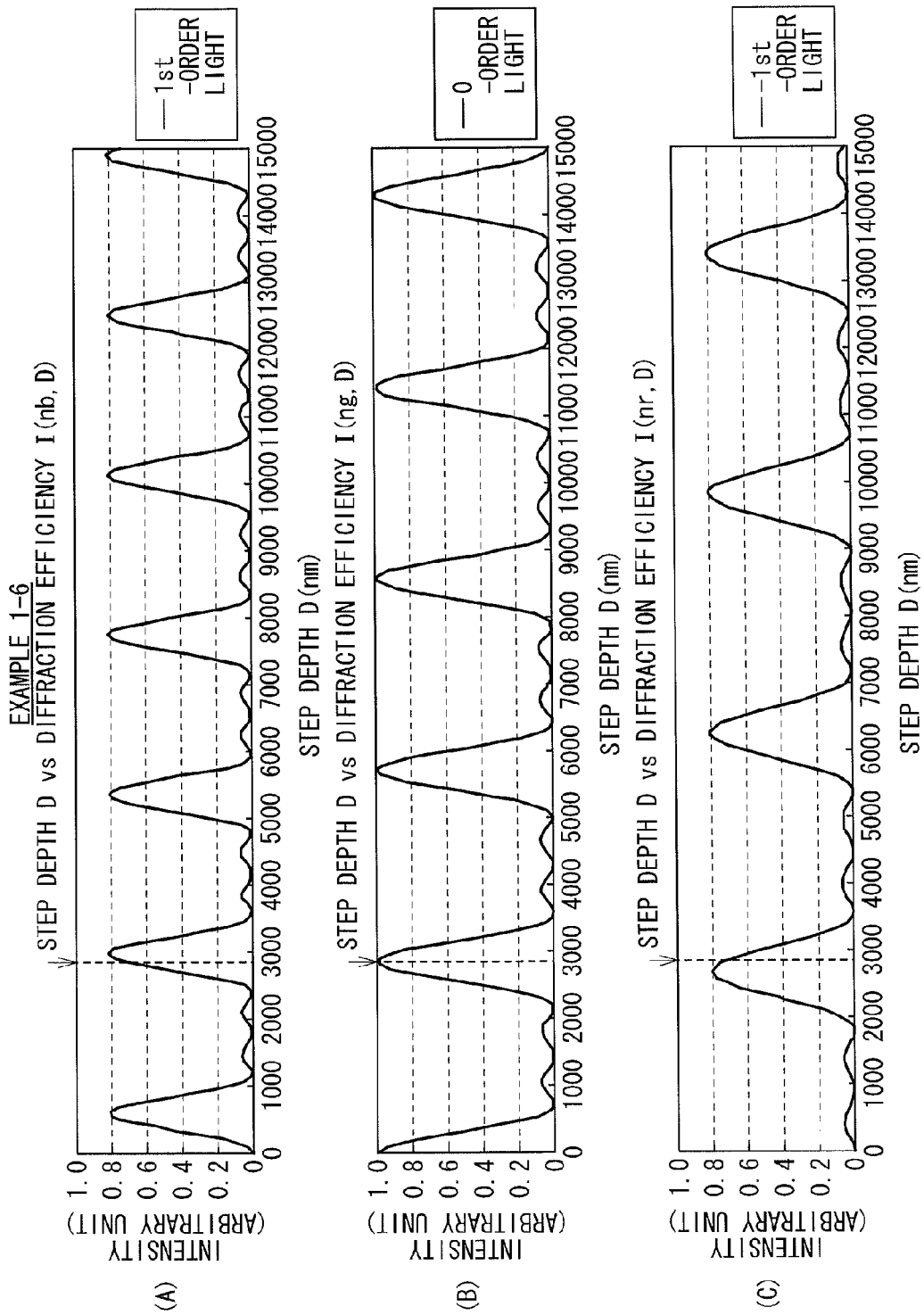
FIG. 18 is a diagram showing the diffraction efficiency characteristics of the optical-path conversion member according to the example 1-6.
Figure 19:
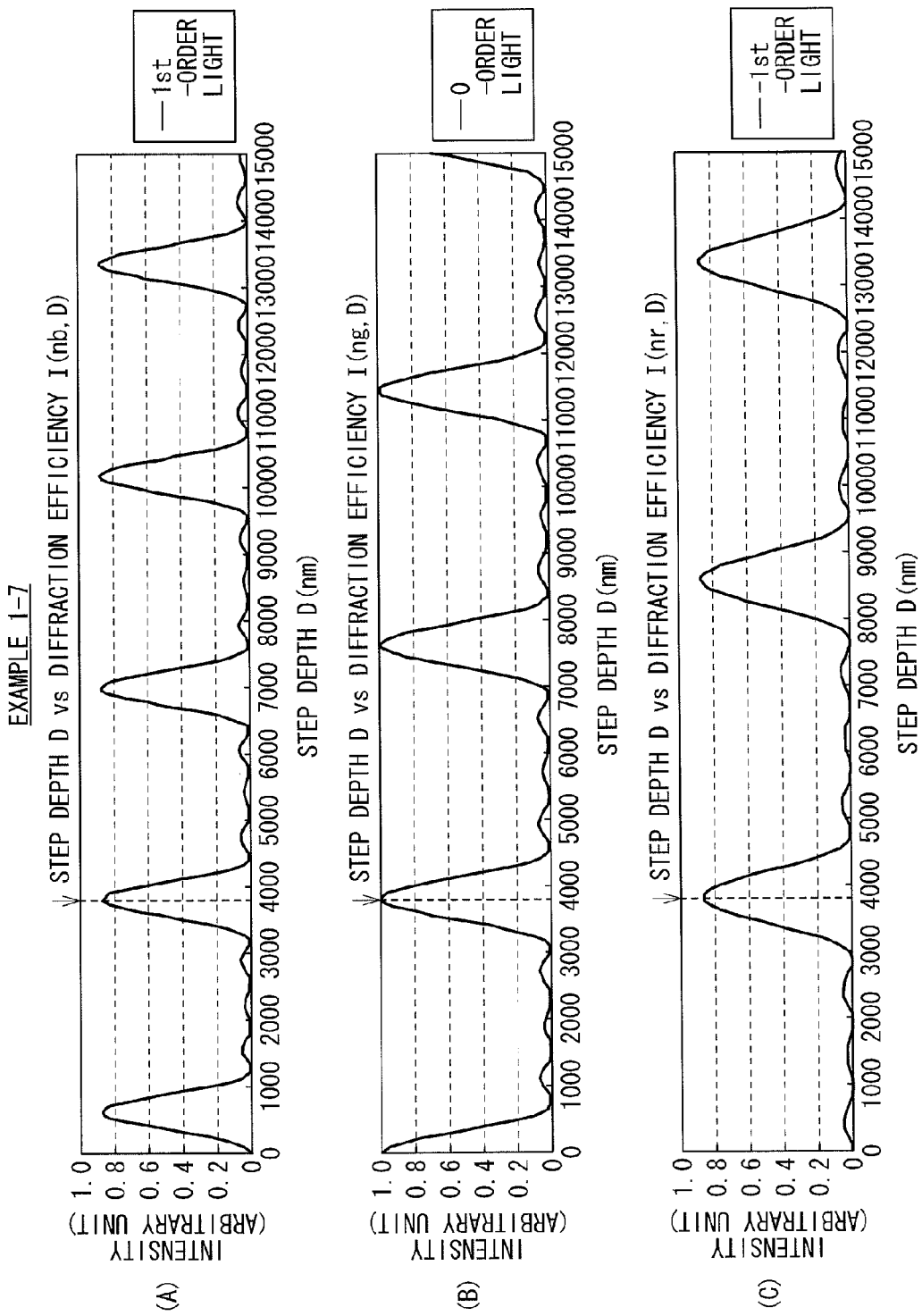
FIG. 19 is a diagram showing the diffraction efficiency characteristics of the optical-path conversion member according to the example 1-7.
Figure 20:
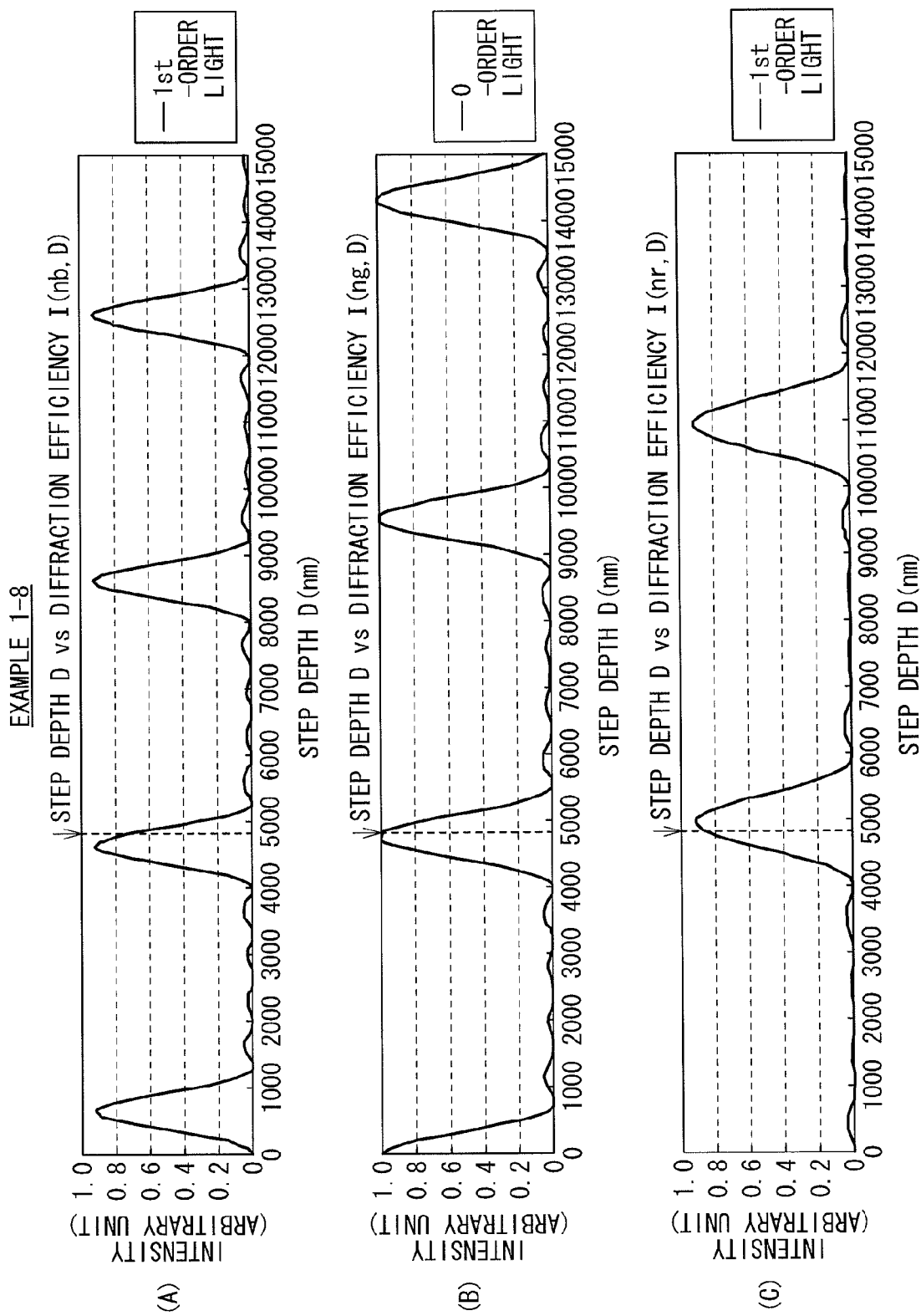
FIG. 20 is a diagram showing the diffraction efficiency characteristics of the optical-path conversion member according to the example 1-8.
Figure 21:
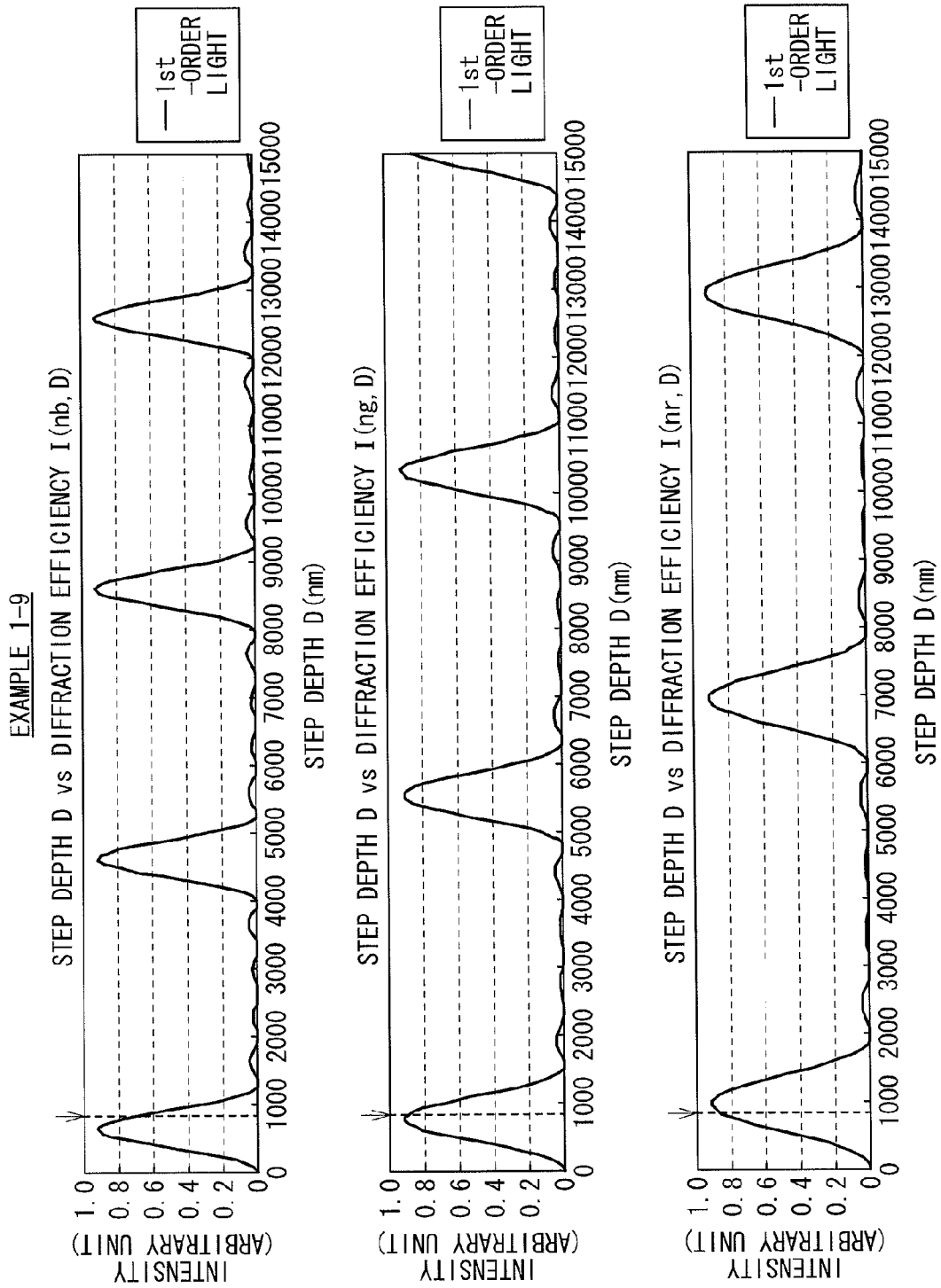
FIG. 21 is a diagram showing the diffraction efficiency characteristics of the optical-path conversion member according to the example 1-9.
Figure 22:
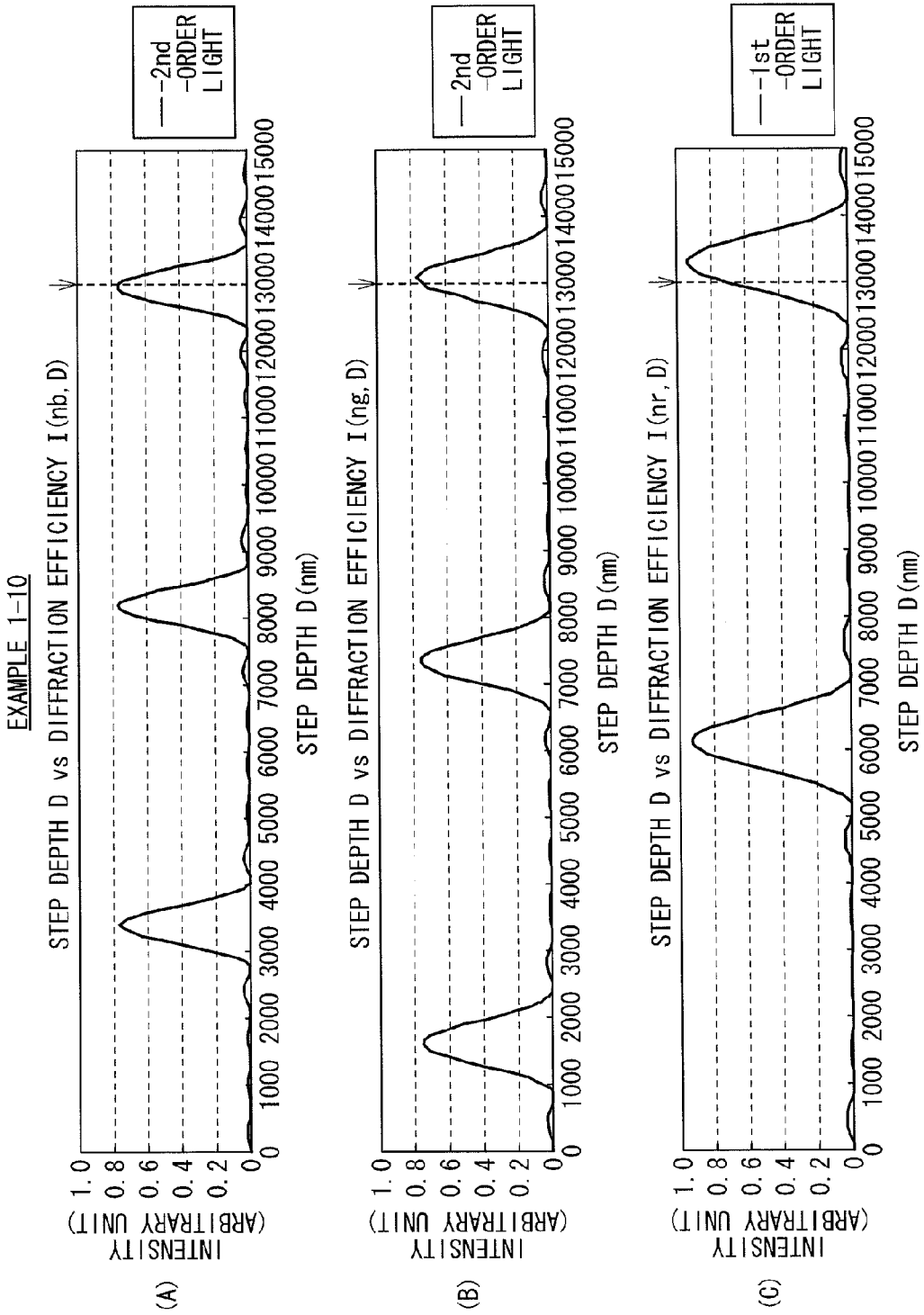
FIG. 22 is a diagram showing the diffraction efficiency characteristics of the optical-path conversion member according to the example 1-10.
Figure 23:
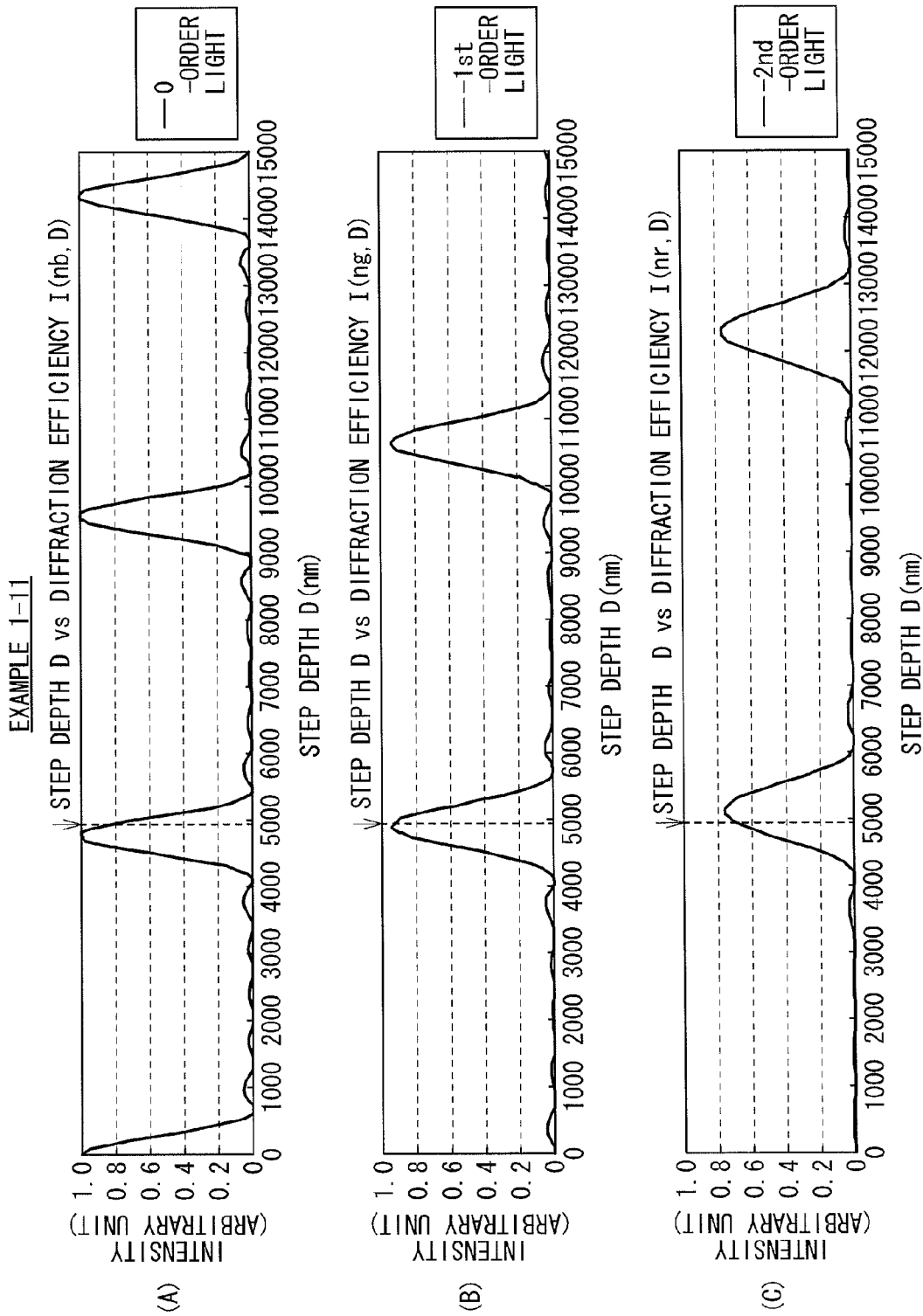
FIG. 23 is a diagram showing the diffraction efficiency characteristics of the optical-path conversion member according to the example 1-11.
Figure 24:
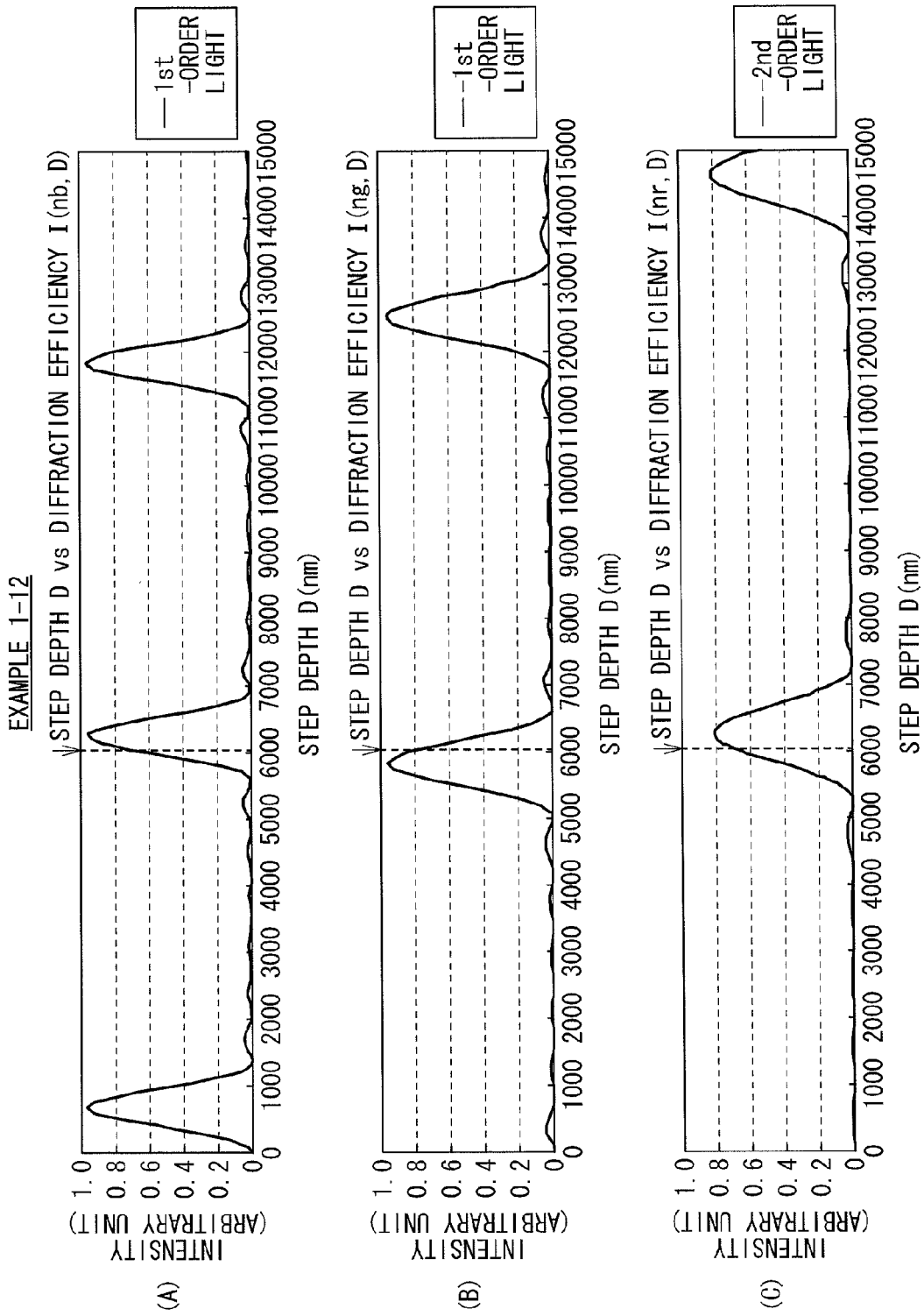
FIG. 24 is a diagram showing the diffraction efficiency characteristics of the optical-path conversion member according to the example 1-12.

FIG. 10 is a conceptual diagram showing the cross-sectional configuration of an optical-path conversion member (an optical-path conversion member 12A) according to a modification example 2. In the optical-path conversion member 12A in this modification example, in the optical-path conversion member 12 in the first embodiment, the diffraction grating structure (the one-dimensional diffraction grating structure) is formed in the blazed structure (sawtooth-like structure) that will be described in detail later instead of the step structure.

The optical-path conversion member 12A has the diffraction grating structure including the base section 120, and tilted planes 120b periodically formed on one plane (surface) side of this base section 120. In other words, the diffraction grating structure in this optical-path conversion member 12A is formed by the above-described blazed structure being the periodical tilted plane structure. In this blazed structure, the depth (step depth) of the tilted plane 120*b* (tilted plane structure) is D, and the pitch of the tilted plane structure (the unit diffraction structure) is P.

When the optical-path conversion member 12A having such a blazed structure is used, it is desirable to satisfy the conditional expression defined by the following expression (19). With the lasers arranged to satisfy this conditional expression, an angle formed by center rays in light coming from the optical-path conversion member 12A becomes 0 degree (color synthesis, optical-path synthesis is performed). Note that, in this expression (19), the blue laser light Lb is assumed to have the wavelength λb of about 435 to 460 nm, the green laser light Lg is assumed to have the wavelength λg of about 500 to 560 nm, and the red laser light Lr is assumed to have the wavelength λr of about 625 to 650 nm. Moreover, in the blue laser light Lb, the green laser light Lg, and the red laser light Lr (n-order diffracted light) emitted from the optical-path conversion member 12A, the diffraction orders are respectively assumed to be nb, ng, and nr, and for the blue laser 11B, the green laser 11G, and the red laser 11R, the distances from the optical axis Z are respectively assumed to be Δb, Δg, and Δr.

[Expression 3]

$$|nb \cdot \lambda b / \Delta b| = |ng \cdot \lambda g / \Delta g| = |nr \cdot \lambda r / \Delta r| \quad (19)$$

Also with the optical-path conversion member 12A in such a blazed structure, when incoming light Lin with the wavelength λ comes, the diffraction efficiency I(n, D) of the n-order diffracted light Ln, and the diffraction angle θn thereof are respectively expressed by the following expressions (20) and (21) (same as the expression (6) described above). Note that, in the expression (20), the medium refractive index on the light-incident side (the optical-path conversion member 12A) is n0, and the medium refractive index on the light-exit side is n1 (=1).

[Expression 4]

$$\begin{cases} I(n, D) = \dfrac{\sin^2\left\{\dfrac{D\pi}{\lambda}(n_0 - n_1)\right\}}{\left\{\dfrac{D\pi}{\lambda}(n_0 - n_1) - n\pi\right\}^2} & (20) \\ \sin(\theta n) = n\lambda / P & (21) \end{cases}$$

Herein, with the optical-path conversion member 12A in this modification example, the depth (step depth) D in the blazed structure is desirably so set that the diffraction efficiency I(n, D) of the n-order diffracted light Ln defined by the expression (20) above is 0.7 or higher (I(n, D)≥0.7). The reasons thereof are the same as those in the case of the step structure described above.

When the above-described conditional expression of I(n, D)≥0.7 is satisfied, the combination of the diffraction orders nb, ng, and nr in the blue, green, and red laser light Lb, Lg, and Lr (n-order diffracted light) is exemplified as those expressed by the following expressions (22) to (24).

$$(nb=+1, ng=+1, nr=+1) \quad (22)$$

$$(nb=+3, ng=+2, nr=+2) \quad (23)$$

$$(nb=+3, ng=+3, nr=+2) \quad (24)$$

Also in this modification example using the optical-path conversion member 12A in such a structure, due to the function same as that of the first embodiment, the effect similar thereto is produced.

EXAMPLES

Next, described are specific examples of the present invention (examples 1 to 4)

Examples 1-1 to 1-12

These examples correspond to examples about an illumination unit using the optical-path conversion member 12 having the step structure, and the three types of laser light sources (the red, green, and blue lasers 11R, 11G, and 11B). Note that the combinations between the number of step levels L and the diffraction orders nb, ng, and nr in the examples 1-1 to 1-12 respectively correspond to the expressions (7) to (18) described above.

FIGS. 11(A) to (F), and FIGS. 12(A) to (F) each indicate, in the form of a table, various parameters in the optical-path conversion member 12 in the examples 1-1 to 1-6, and those in the examples 1-7 to 1-12. Note that, in these drawings, the diffraction efficiencies I(nb, D), I(ng, D), and I(nr, D) are respectively the diffraction efficiencies of the diffracted light of blue, green, and red laser light Lb, Lg, and Lr, and this is applicable also to other examples that will be described later.

Moreover, FIGS. 13 to 24 each show the relationship between the step depth D and the diffraction efficiency (diffraction efficiency characteristics) in the optical-path conversion member 12 in the examples 1-1 to 1-12. In these drawings, (A) indicates the diffraction efficiency characteristics of the diffraction efficiency I(nb, D), (B) indicates the diffraction efficiency characteristics of the diffraction efficiency I(ng, D) and (C) indicates the diffraction efficiency characteristics of the diffraction efficiency I(nr, D). Moreover, arrows shown in these drawings each indicate the depth (step depth) D in the step structure when the conditional expression of I(n, D)≥0.7 described above is satisfied, and this is applicable also to examples 3-1 to 3-34 that will be described later.

By referring to FIGS. 13 to 24, in any of the examples 1-1 to 1-12, with the setting of the step depths D as indicated by arrows in the drawings, it is known that the conditional expressions of the diffraction efficiencies I(nb, D), I(ng, D), and I(nr, D)≥0.7 are satisfied.

Examples 2-1 to 2-3

These examples correspond to examples about an illumination unit using the optical-path conversion member 12 having the blazed structure, and the three types of laser light sources (the red, green, and blue lasers 11R, 11G, and 11B). Note that the combinations of the diffraction orders nb, ng, and nr in the examples 2-1 to 2-3 respectively correspond to the expressions (22) to (24) described above.

FIGS. 25(A) to (C) each indicate, in the form of a table, various parameters in the optical-path conversion member 12A in the examples 2-1 to 2-3. Moreover, FIGS. 26 to 28 each show the relationship between the step depth D and the diffraction efficiency (diffraction efficiency characteristics) in the optical-path conversion member 12A in the examples 2-1 to 2-3. Note that, in FIGS. 26 to 28, (A) indicates the diffraction efficiency characteristics of the diffraction efficiency I(nb, D), (B) indicates the diffraction efficiency characteristics of the diffraction efficiency I(ng, D), and (C) indicates the diffraction efficiency characteristics of the diffraction efficiency I(nr, D). Moreover, arrows in these drawings each indicate the depth (step depth) D in the blazed structure when the conditional expression of I(n, D)≥0.7 described above is satisfied, and this is applicable also to examples 4-1 to 4-8 that will be described later.

Figure 26:
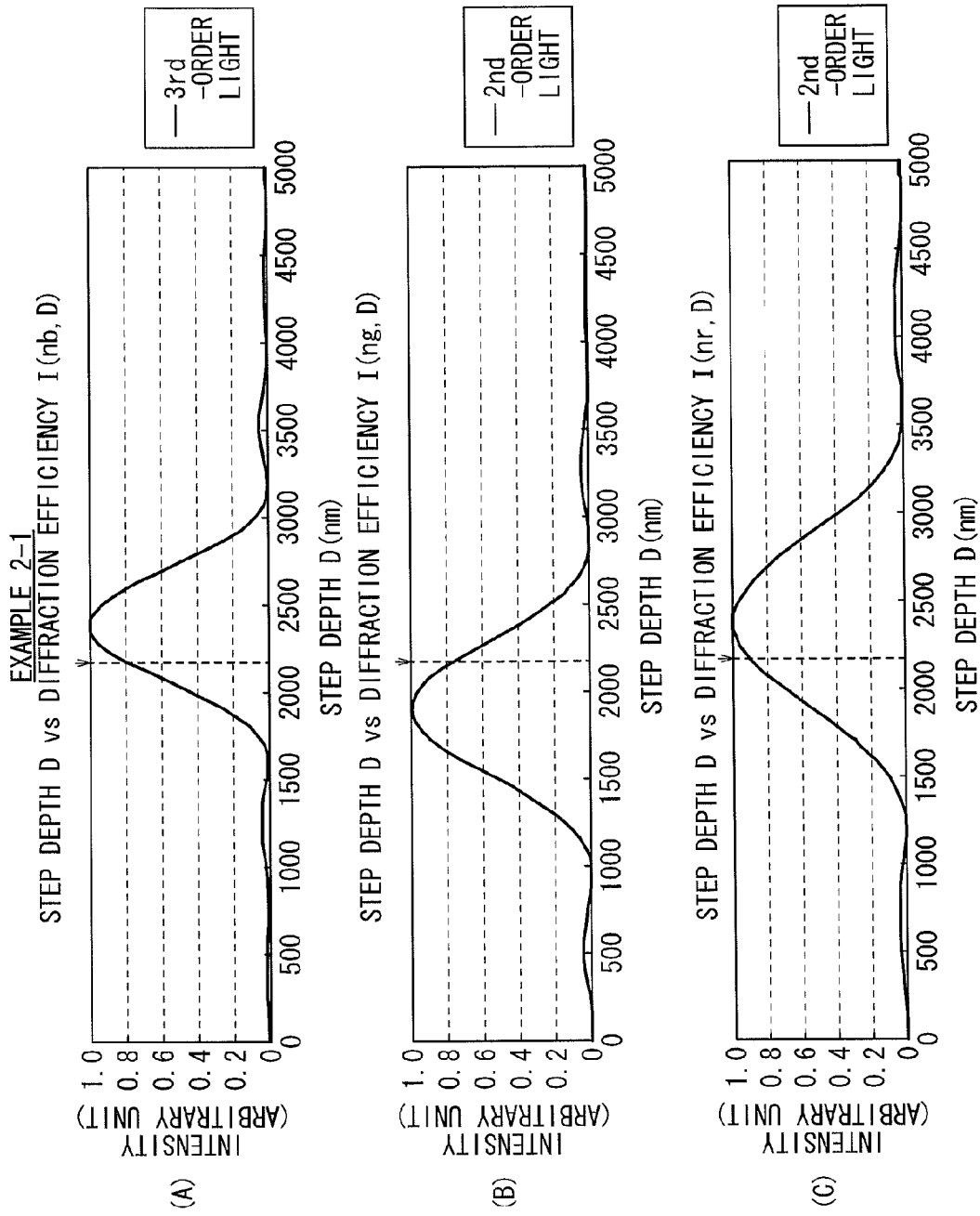
FIG. 26 is a diagram showing the diffraction efficiency characteristics of the optical-path conversion member according to the example 2-1.
Figure 27:
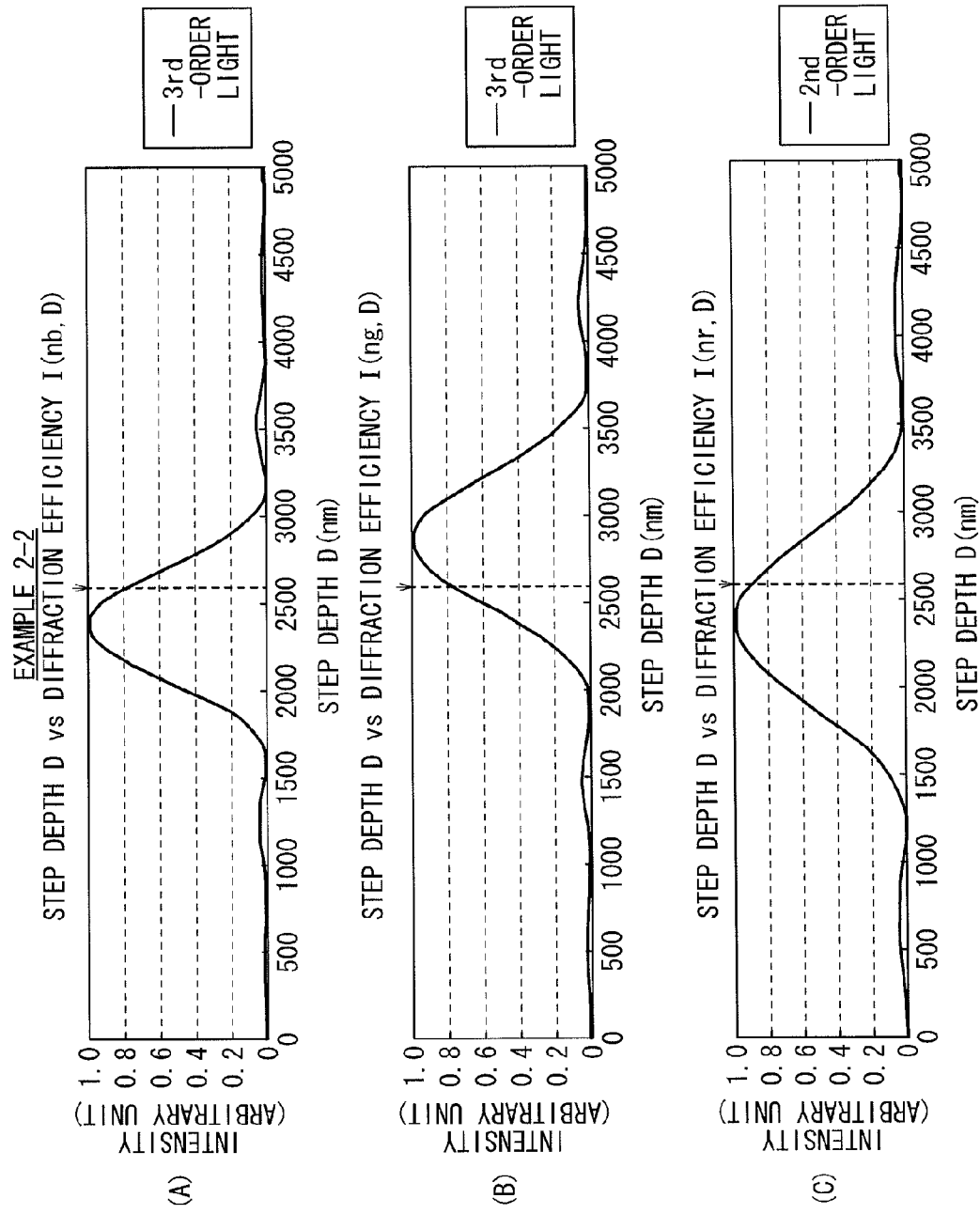
FIG. 27 is a diagram showing the diffraction efficiency characteristics of the optical-path conversion member according to the example 2-2.
Figure 28:
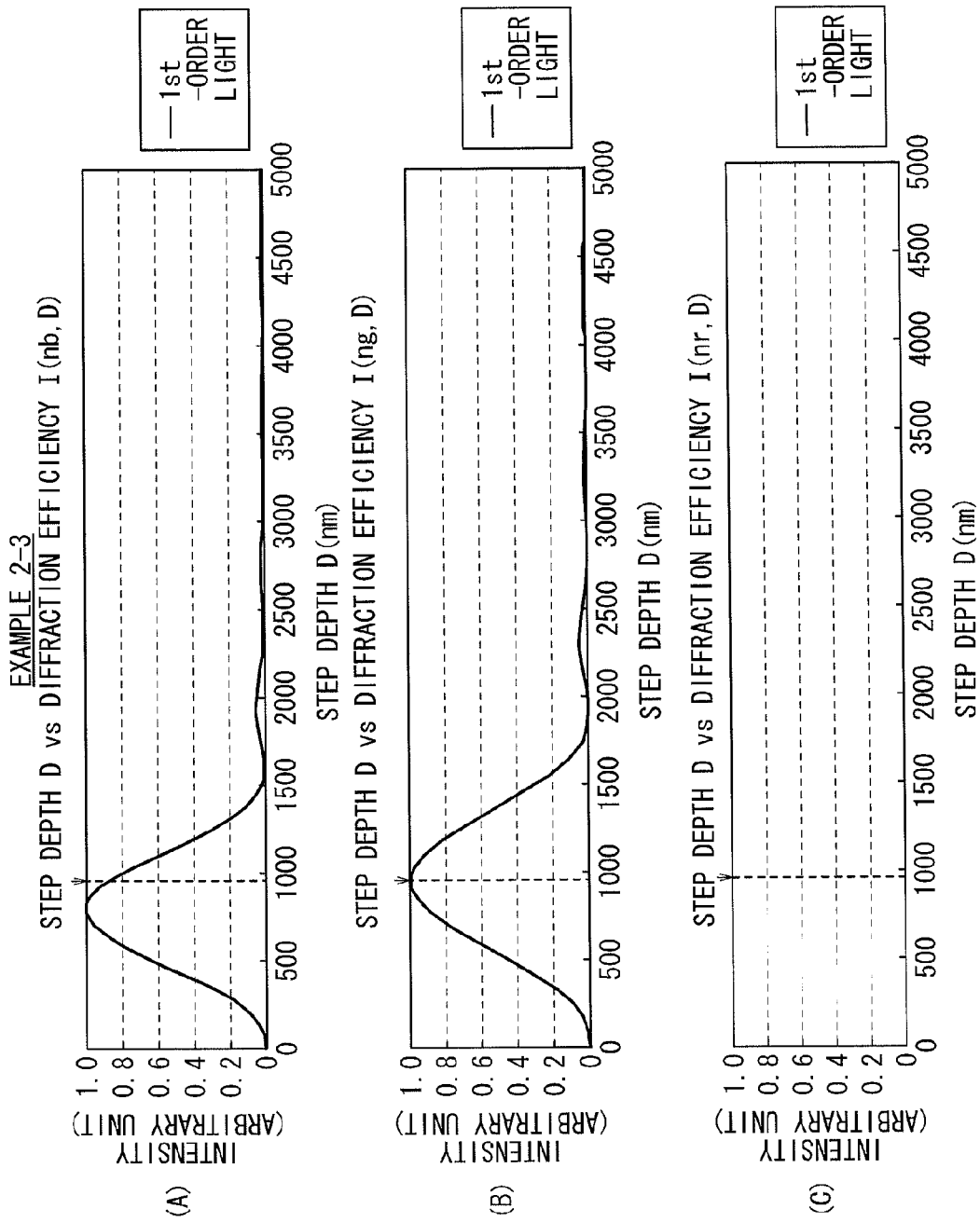
FIG. 28 is a diagram showing the diffraction efficiency characteristics of the optical-path conversion member according to the example 2-3.
Figure 35:
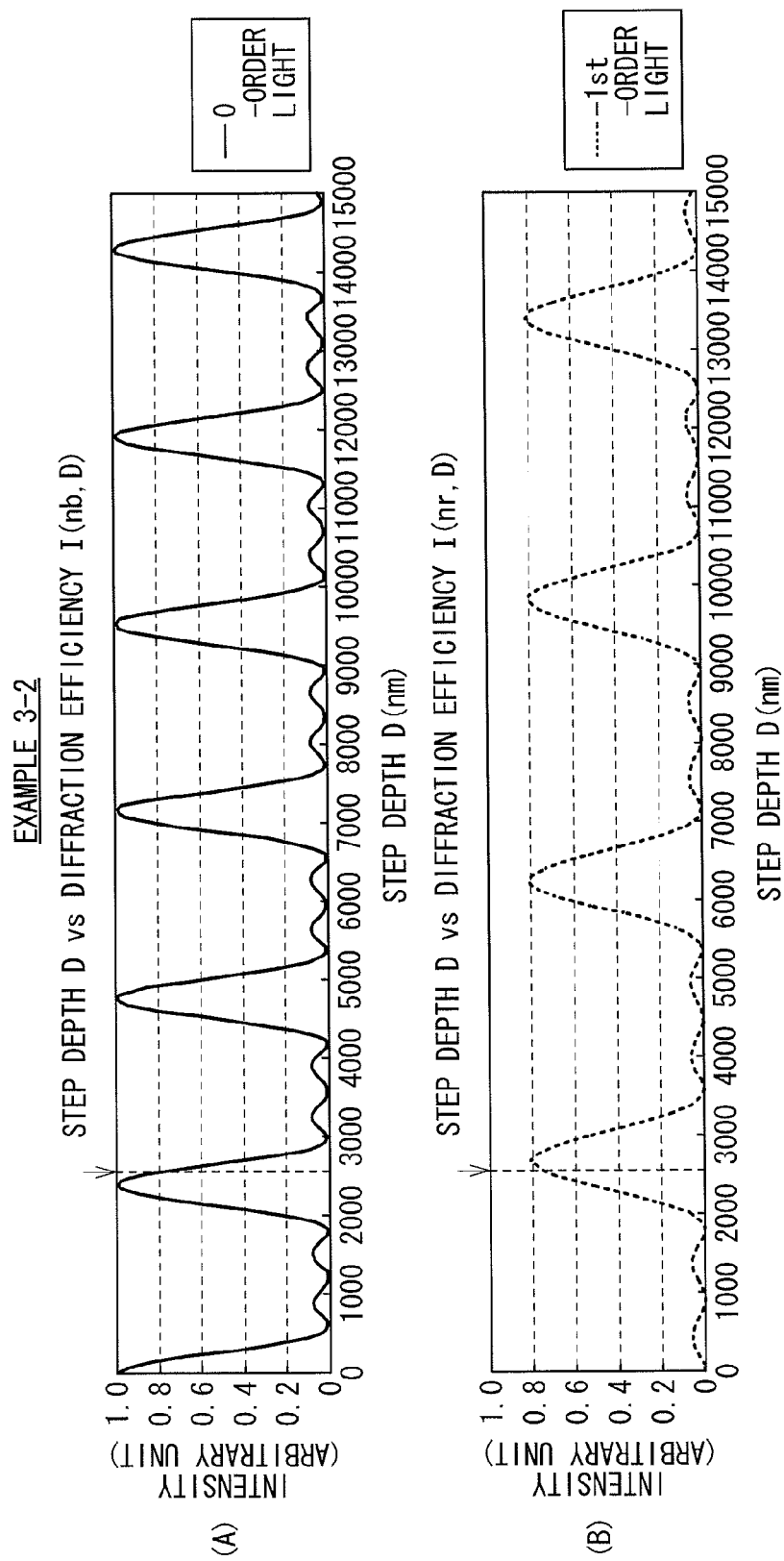
FIG. 35 is a diagram showing the diffraction efficiency characteristics of the optical-path conversion member according to the example 3-2.
Figure 36:
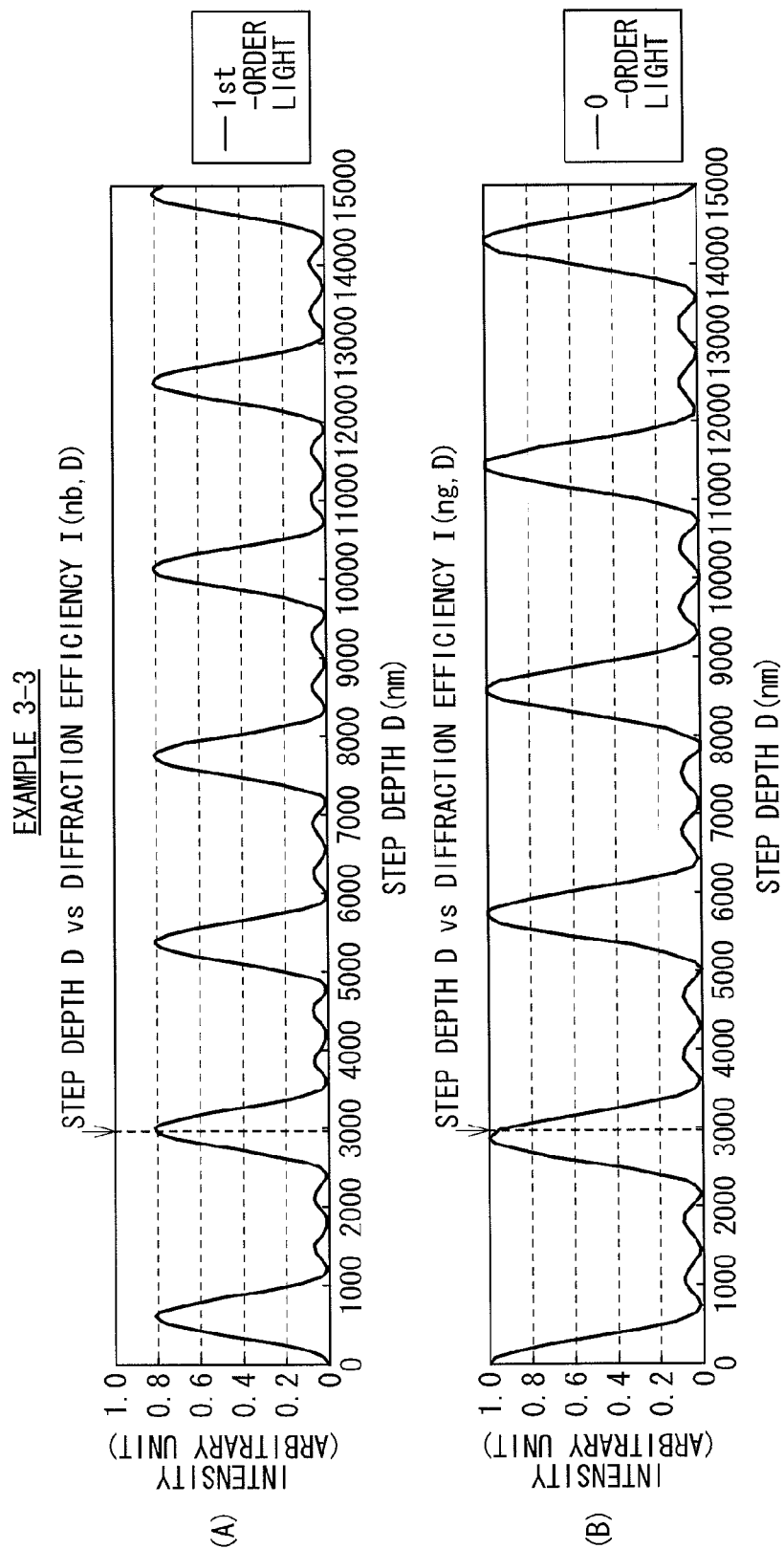
FIG. 36 is a diagram showing the diffraction efficiency characteristics of the optical-path conversion member according to the example 3-3.
Figure 37:
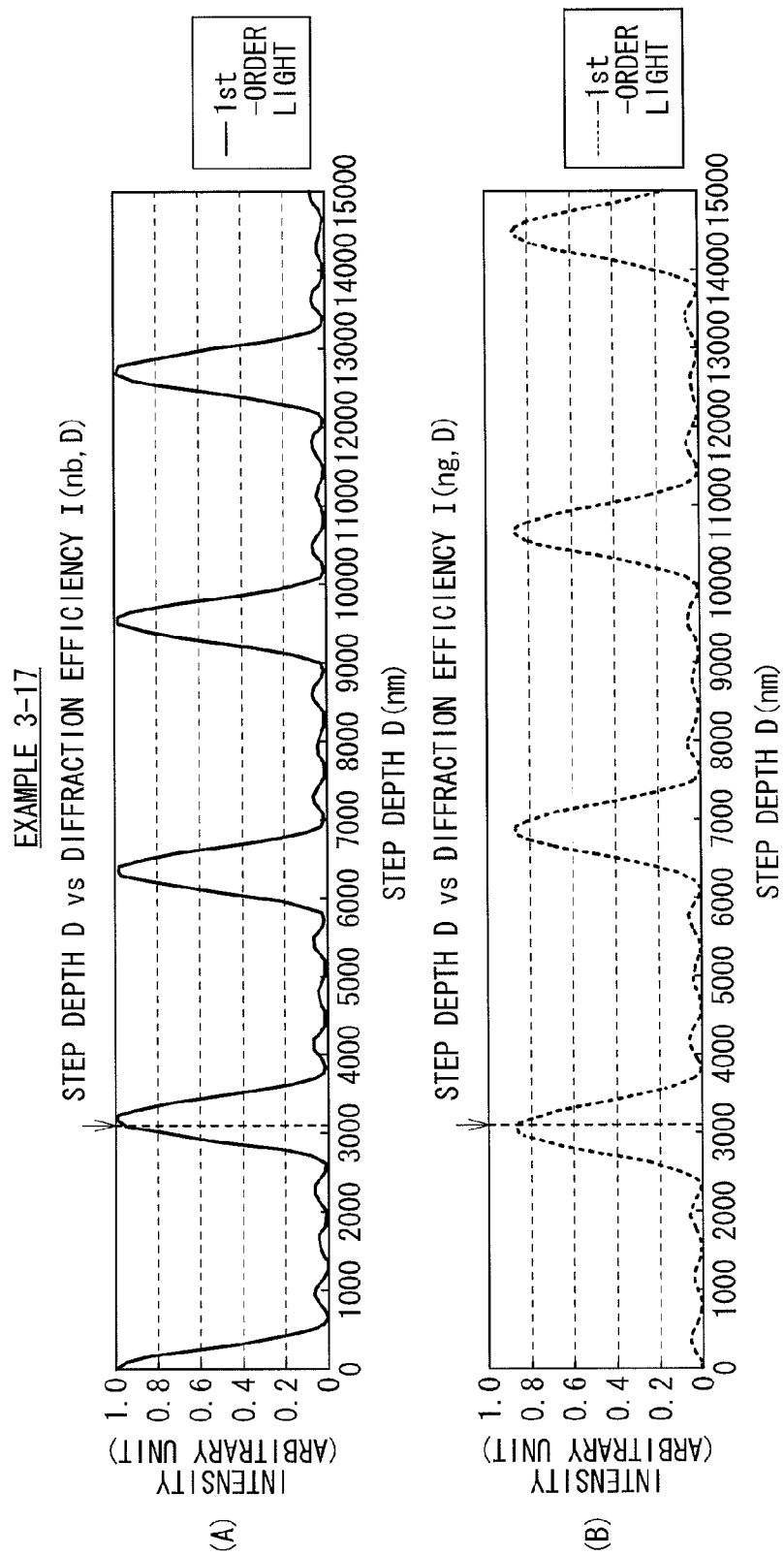
FIG. 37 is a diagram showing the diffraction efficiency characteristics of the optical-path conversion member according to the example 3-17.
Figure 38:
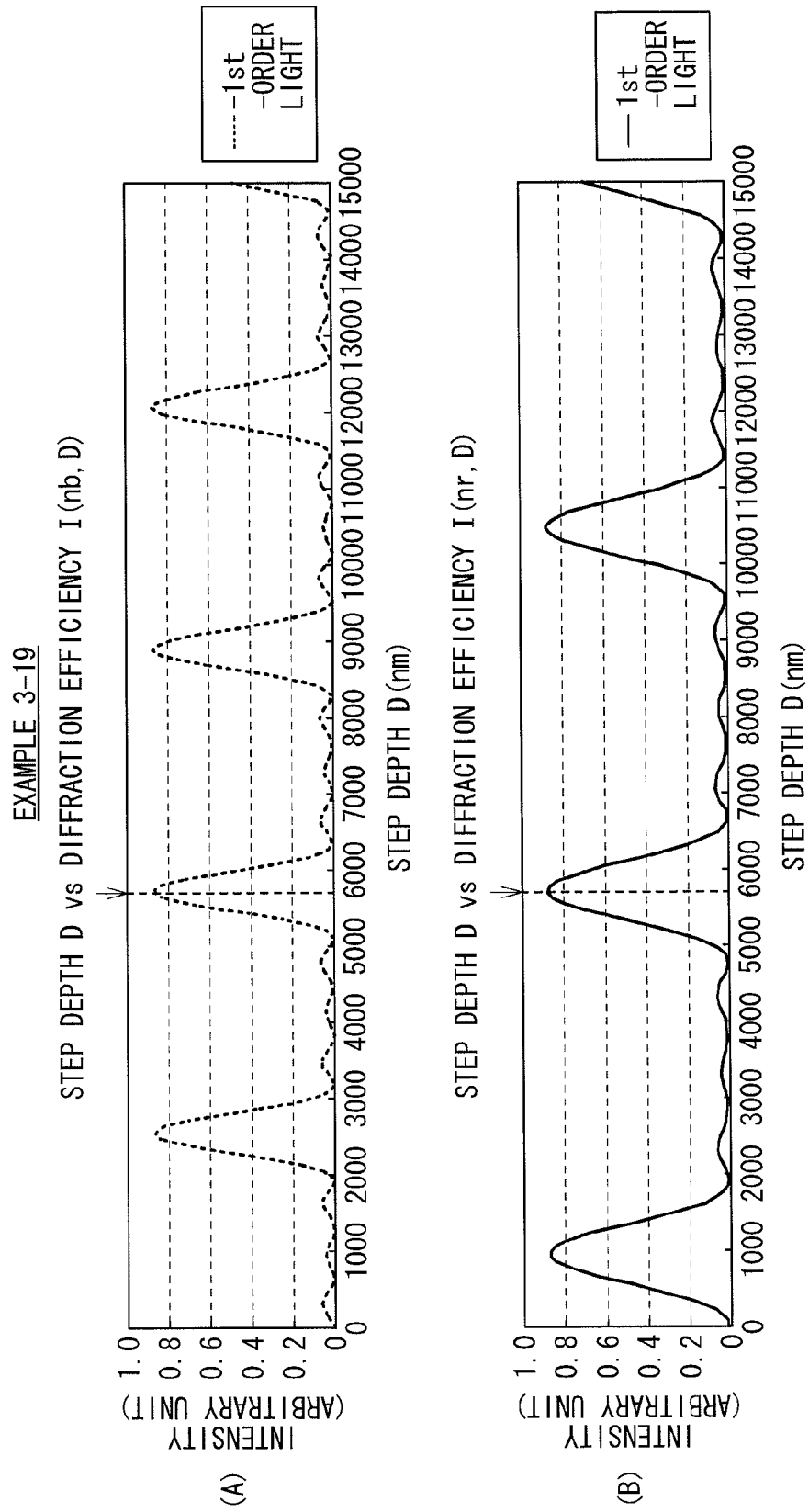
FIG. 38 is a diagram showing the diffraction efficiency characteristics of the optical-path conversion member according to the example 3-19.

By referring to FIGS. 26 to 28, in any of the examples 2-1 to 2-3, with the setting of the step depths D as indicated by arrows in the drawings, it is known that the conditional expressions of the diffraction efficiencies I(nb, D), I(ng, D), and I(nr, D)≥0.7 are satisfied.

Examples 3-1 to 3-34

These examples correspond to examples about an illumination unit using the optical-path conversion member 12 having the step structure, and the two types of laser light sources (two types from the red, green, and blue lasers 11R, 11G, and 11B).

FIGS. 29(A) to (F), FIGS. 30(A) to (F), FIGS. 31(A) to (F), FIGS. 32(A) to (F), FIGS. 33(A) to (F), and FIGS. 34(A) to (D) respectively indicate, in the form of a table, various parameters in the optical-path conversion member 12 in the examples 3-1 to 3-6, 3-7 to 3-12, 3-13 to 3-18, 3-19 to 3-24, 3-25 to 3-30, and 3-31 to 3-34. Moreover, FIGS. 35 to 38 each show, of these examples 3-1 to 3-34, the relationship between the step depth D and the diffraction efficiency (diffraction efficiency characteristics) in the optical-path conversion member 12 in the examples 3-2, 3-3, 3-17, and 3-19. Note that, in FIGS. 35 to 38, (A) and (B) indicate the diffraction efficiency characteristics of any two of the diffraction efficiencies I(nb, D), I(ng, D), and I(nr, D).

By referring to FIGS. 29 to 34, and FIGS. 35 to 38, also in the examples 3-1 to 3-34, with the setting of the step depths D as indicated by arrows in the drawings, it is known that any two of the conditional expressions of the diffraction efficiencies I(nb, D), I(ng, D), and I(nr, D)≥0.7 are satisfied.

Examples 4-1 to 4-8

These examples correspond to examples about an illumination unit using the optical-path conversion member 12A having the blazed structure, and the two types of laser light sources (two types from the red, green, and blue lasers 11R, 11G, and 11B).

FIGS. 39(A) to (F), and FIGS. 40(A) and (B) respectively indicate, in the form of a table, various parameters in the optical-path conversion member 12A in the examples 4-1 to 4-6, and 4-7 and 4-8. Moreover, FIGS. 41 and 42 each show, of these examples 4-1 to 4-8, the relationship between the step depth D and the diffraction efficiency (diffraction efficiency characteristics) in the optical-path conversion member 12A in the examples 4-4 and 4-8. Note that, in FIGS. 41 and 42, (A) indicates the diffraction efficiency characteristics of the diffraction efficiency I(nb, D), and (B) indicates the diffraction efficiency characteristics of the diffraction efficiency I(nr, D).

By referring to FIGS. 39, 40, 41, and 42, also in the examples 4-1 to 4-8, with the setting of the step depths D as indicated by arrows in the drawings, it is known that any two of the conditional expressions of the diffraction efficiency I(nb, D), I(ng, D), and I(nr, D)≥0.7 are satisfied.

Other Modification Examples

While the present invention has been described by referring to the embodiments, the modification examples, and the examples, the present invention is not restrictive to the embodiments and others as such, and numerous other modifications may be possibly devised.

For example, in the embodiments and others described above, the description is given by exemplifying the step structure and the blazed structure as the diffraction grating structure in the optical-path conversion member. These cases are not restrictive, and an optical-path conversion member having the diffraction grating structure being any other structure may be used.

Moreover, in the embodiments and others described above, described is the case where a plurality types of light sources in the light source unit (the light source section) are each a laser light source. This case is not restrictive, and one or more of these plurality types of light sources may be a laser light source. In other words, in the light source section, a combination of a laser light source and any other light source (for example, LED) may be provided.

Furthermore, in the embodiments and others described above, the description is given by exemplifying the case where the light modulation device is of a reflective type. This case is not restrictive, and it may be a transmissive light modulation device, for example.

In addition, in the embodiments and others described above, the description is given by exemplifying the case where the light source unit (the light source section) is packaged to accommodate a plurality types of lasers (light sources). The arrangement of the light sources in the light source section is not restricted thereto. In other words, if the light source section includes a plurality types of light sources, any other arrangement may be also possible.

Further, in the embodiments and others described above, the description is given by specifically exemplifying the structure components (the optical system) of the illumination unit and those of the display. However, all of the structure components are not necessarily provided, or any other structure components may be additionally provided.

Still further, in the embodiments and others described above, the description is given by exemplifying the case where a projection-type display is configured by including the projection optical system (the projection lens) that projects light modulated by the light modulation device onto the screen. However, the present invention is applicable also to a direct-view-type display, for example.

In addition, in the embodiments and others described above, for the application of the illumination unit of the present invention, the description is given by exemplifying the projection-type display. This is not restrictive, and it is applicable to an exposure unit such as a stepper, for example.

The invention claimed is:
1. An illumination unit, comprising:
a light source section including a plurality types of light sources emitting light of various different wavelengths, each light source emitting light with a center ray;
a lens;
an optical-path conversion member comprising a diffraction grating structure between the light source section and the lens and that performs optical-path conversion on incoming light coming from the plurality types of light sources and reduces an angle between the center rays; and
a retardation film between the lens and the light source section,
wherein,
a far field pattern (FFP) of the light emitted from each of the plurality types of light sources is in an in-plane anisotropic shape,
a long-axis direction of the FFP is the same among the plurality types of light sources,
there are two types of polarizing directions for the light emitted from the plurality types of light sources,
the retardation film reduces a difference between the polarizing directions by changing at least one of the two types of polarizing directions, and the diffraction grating structure (a) has a step structure with a periodical step-different plane structure, and when an order of diffracted light emitted from the step structure is n, and when a depth of the step-different plane structure is D, the depth D is set to allow, for the light emitted from each of the plurality types of light sources, diffracted light from the step structure to have a diffraction efficiency I(n, D) of 0.7 or higher, or (b) has a blazed structure of a periodical tilted plane structure, and when an order of diffracted light emitted from the blazed structure is n, and when a depth of the tilted plane structure is D, the depth D is set to allow, for the light emitted from each of the plurality types of light sources, diffracted light from the blazed structure to have a diffraction efficiency I(n, D) of 0.7 or higher.

2. The illumination unit according to claim 1, wherein the optical-path conversion member performs the optical-path conversion to make a substantially 0 degree angle formed by center rays in outgoing light from this optical-path conversion member.

3. The illumination unit according to claim 1, wherein:
the diffraction grating structure has the step structure with a periodical step-different plane structure, and
when an order of diffracted light emitted from the step structure is n, and when a depth of the step-different plane structure is D, the depth D is set to allow, for the light emitted from each of the plurality types of light sources, diffracted light from the step structure to have a diffraction efficiency I(n, D) of 0.7 or higher.

4. The illumination unit according to claim 1, wherein:
the diffraction grating structure has the blazed structure of a periodical tilted plane structure, and
when an order of diffracted light emitted from the blazed structure is n, and when a depth of the tilted plane structure is D, the depth D is set to allow, for the light emitted from each of the plurality types of light sources, diffracted light from the blazed structure to have a diffraction efficiency I(n, D) of 0.7 or higher.

5. The illumination unit according to claim 1, wherein the retardation film selectively changes the two types of polarizing directions to coincide these polarizing directions with each other.

6. The illumination unit according to claim 1, wherein in the light source section, one or more of the light sources are disposed with a tilt with respect to an optical axis.

7. The illumination unit according to claim 1, wherein the light source section is packaged to accommodate therein the plurality types of light sources.

8. The illumination unit according to claim 1, wherein the plurality types of light sources are three types of light sources emitting light of red, green, or blue colors or any combination of them.

9. The illumination unit according to claim 1, wherein at least one the plurality types of light sources is a laser light source.

10. The illumination unit of claim 1, wherein the retardation film is between the diffraction grating structure and the lens.

11. The illumination unit of claim 10, wherein the lens is a collimator lens.

12. A display including an illumination unit and a light modulation device that modulates illumination light from the illumination unit based on an image signal, the illumination unit comprising:

a light source section including a plurality types of light sources emitting light of various different wavelengths, each light source emitting light with a center ray;
a lens;
a retardation film between the light source section and the lens; and
an optical-path conversion member comprising a diffraction grating structure between the light source section and the lens and that performs optical-path conversion on incoming light coming from the plurality types of light sources and reduces an angle between the center rays,
wherein,
a far field pattern (FFP) of the light emitted from each of the plurality types of light sources is in an in-plane anisotropic shape,
a long-axis direction of the FFP is the same among the plurality types of light sources,
there are two types of polarizing directions for the light emitted from the plurality types of light sources,
the retardation film reduces a difference between the polarizing directions by changing the at least one of the two types of polarizing directions, and
the diffraction grating structure (a) has a step structure with a periodical step-different plane structure, and when an order of diffracted light emitted from the step structure is n, and when a depth of the step-different plane structure is D, the depth D is set to allow, for the light emitted from each of the plurality types of light sources, diffracted light from the step structure to have a diffraction efficiency I(n, D) of 0.7 or higher, or (b) has a blazed structure of a periodical tilted plane structure, and when an order of diffracted light emitted from the blazed structure is n, and when a depth of the tilted plane structure is D, the depth D is set to allow, for the light emitted from each of the plurality types of light sources, diffracted light from the blazed structure to have a diffraction efficiency I(n, D) of 0.7 or higher.

13. The display according to claim 12, further comprising a projection optical system projecting the illumination light modulated by the light modulation device onto a projection surface.

14. The display according to claim 12, wherein the light modulation device is a liquid crystal device.

15. The display of claim 12, wherein the diffraction grating structure has the step structure with a periodical step-different plane structure, and when an order of diffracted light emitted from the step structure is n, and when a depth of the step-different plane structure is D, the depth D is set to allow, for the light emitted from each of the plurality types of light sources, diffracted light from the step structure to have a diffraction efficiency I(n, D) of 0.7 or higher.

16. The display of claim 12, wherein the diffraction grating structure has the blazed structure of a periodical tilted plane structure, and when an order of diffracted light emitted from the blazed structure is n, and when a depth of the tilted plane structure is D, the depth D is set to allow, for the light emitted from each of the plurality types of light sources, diffracted light from the blazed structure to have a diffraction efficiency I(n, D) of 0.7 or higher.

* * * * *